United States Patent
Wang et al.

(10) Patent No.: US 9,674,848 B2
(45) Date of Patent: Jun. 6, 2017

(54) METHOD AND APPARATUS FOR ACQUIRING DOWNLINK QUALITY INFORMATION

(71) Applicant: HUAWEI TECHNOLOGIES CO., LTD., Shenzhen (CN)

(72) Inventors: Fan Wang, Stockholm (SE); Xueli Ma, Shenzhen (CN); Chuanfeng He, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/010,358

(22) Filed: Jan. 29, 2016

(65) Prior Publication Data

US 2016/0174234 A1 Jun. 16, 2016

Related U.S. Application Data

(63) Continuation of application No. PCT/CN2013/080439, filed on Jul. 30, 2013.

(51) Int. Cl.
*H04W 24/02* (2009.01)
*H04L 12/26* (2006.01)
(Continued)

(52) U.S. Cl.
CPC .......... *H04W 72/085* (2013.01); *H04B 17/24* (2015.01); *H04B 17/327* (2015.01);
(Continued)

(58) Field of Classification Search
None
See application file for complete search history.

(56) References Cited

U.S. PATENT DOCUMENTS

2010/0238830 A1* 9/2010 Kim .................... H04W 52/365
370/252
2011/0195731 A1 8/2011 Jang et al.
(Continued)

FOREIGN PATENT DOCUMENTS

CN 1866779 A 11/2006
CN 101247147 A 8/2008
(Continued)

OTHER PUBLICATIONS

"Uplink Rate Adaption", Improved High Rate Performance, Ericsson Confidential, Dec. 11, 2012, 6 pages.
(Continued)

*Primary Examiner* — Edan Orgad
*Assistant Examiner* — Sithu Ko
(74) *Attorney, Agent, or Firm* — Staas & Halsey LLP

(57) ABSTRACT

The present invention discloses a method and an apparatus for acquiring downlink quality information, which relate to the communications field and are used to resolve a problem in the prior art that a base station cannot learn interference caused by a UE to a neighboring cell. The method provided in the present invention includes: measuring the downlink quality information; and reporting the downlink quality information to a network-side device. The present invention is applicable to the communications field, and is used for acquiring the downlink quality information by the base station.

14 Claims, 5 Drawing Sheets

(51) Int. Cl.
| | |
|---|---|
| *H04W 72/08* | (2009.01) |
| *H04B 17/24* | (2015.01) |
| *H04B 17/327* | (2015.01) |
| *H04B 17/345* | (2015.01) |
| *H04W 52/14* | (2009.01) |
| *H04W 52/24* | (2009.01) |
| *H04W 24/10* | (2009.01) |
| *H04W 36/00* | (2009.01) |
| *H04W 72/04* | (2009.01) |
| *H04W 52/16* | (2009.01) |
| *H04W 52/28* | (2009.01) |
| *H04W 52/32* | (2009.01) |
| *H04W 52/36* | (2009.01) |
| *H04W 52/38* | (2009.01) |

(52) U.S. Cl.
CPC .......... *H04B 17/345* (2015.01); *H04W 24/10* (2013.01); *H04W 36/0094* (2013.01); *H04W 52/146* (2013.01); *H04W 52/241* (2013.01); *H04W 52/242* (2013.01); *H04W 52/243* (2013.01); *H04W 52/245* (2013.01); *H04W 72/0473* (2013.01); *H04W 52/16* (2013.01); *H04W 52/281* (2013.01); *H04W 52/286* (2013.01); *H04W 52/325* (2013.01); *H04W 52/365* (2013.01); *H04W 52/367* (2013.01); *H04W 52/386* (2013.01)

(56) References Cited

U.S. PATENT DOCUMENTS

| | | | |
|---|---|---|---|
| 2012/0201134 A1* | 8/2012 | Wang Helmersson | H04W 52/146 370/230 |
| 2015/0189519 A1* | 7/2015 | Hoglund | H04W 16/08 455/424 |

FOREIGN PATENT DOCUMENTS

| | | |
|---|---|---|
| CN | 101442345 A | 5/2009 |
| CN | 101572904 A | 11/2009 |
| CN | 102045823 A | 5/2011 |

OTHER PUBLICATIONS

"Fast CQI report in CELL_FACH state", 3GPP TSG-RAN WG2 #60bis, Jan. 14-18, Sevilla, Spain, R2-080109, 3 pages.

"Uplink MIMO operation principles", 3GPP TSG RAN WG1 Meeting #65, May 9-13, 2011, Barcelona, Spain, R1-111493, 6 pages.

"Enhancements to increase 2 ms TTI coverage", 3GPP TSG-RAN WG2 #81, Jan. 28-Feb. 1, 2013, St. Julian's, Malta, R2-130250, 2 pages.

Extended European Search Report dated May 23, 2016 in corresponding European Patent Application No. 13890751.4.

International Search Report dated May 5, 2014 in corresponding International Patent Application No. PCT/CN2013/080439.

International Search Report mailed May 5, 2014, in corresponding International Application No. PCT/CN2013/080439.

* cited by examiner

METHOD AND APPARATUS FOR ACQUIRING DOWNLINK QUALITY INFORMATION

CROSS-REFERENCE TO RELATED APPLICATIONS

This application is a continuation of International Patent Application No. PCT/CN2013/080439 filed on Jul. 30, 2013, which is hereby incorporated by reference in its entirety.

TECHNICAL FIELD

The present invention relates to the communications field, and in particular, to a method and an apparatus for acquiring downlink quality information.

BACKGROUND

The UMTS (Universal Mobile Telecommunications System) is a global 3G wireless communications standard formulated by 3GPP (3rd Generation Partnership Project) of the International Organization for Standardization. To meet an increasing requirement of a user on a rate, HSPA (High Speed Packet Access) technologies, including HSDPA (High Speed Downlink Packet Access) and HSUPA (High Speed Uplink Packet Access), are introduced into the UMTS. An HSUPA scheduler is disposed on a NodeB (base station), and the HSUPA scheduler is configured to perform scheduling on a UE (user equipment) in a cell. Specifically, the NodeB acquires transmission power headroom of the UE and an amount of to-be-sent data according to an SI (scheduling information) packet reported by the UE. The inventor finds that by using this method in the prior art, the NodeB cannot learn about interference caused by the UE to a neighboring cell.

SUMMARY

Embodiments of the present invention provide a method and an apparatus for acquiring downlink quality information, which can resolve a problem in the prior art that a NodeB cannot learn about interference caused by a UE to a neighboring cell.

To achieve the foregoing objective, the following technical solutions are adopted in the embodiments of the present invention:

According to a first aspect, an embodiment of the present invention provides a method for acquiring downlink quality information, where the method includes:

measuring the downlink quality information; and reporting the downlink quality information to a network-side device.

In a first possible implementation manner, the measuring the downlink quality information specifically includes:

measuring a downlink of a primary cell and a downlink of a neighboring cell, and acquiring at least one type of downlink quality information of the primary cell and downlink quality information of the neighboring cell.

With reference to the first possible implementation manner of the first aspect, in a second possible implementation manner, the measuring a downlink of a primary cell and a downlink of a neighboring cell includes:

measuring downlink transmission pathloss Pathloss information of the primary cell, and/or measuring downlink Pathloss information of the neighboring cell; or measuring information about a Pathloss difference between the downlink of the primary cell and the downlink of the neighboring cell.

With reference to the second possible implementation manner of the first aspect, in a third possible implementation manner, the acquiring at least one type of downlink quality information of the primary cell and downlink quality information of the neighboring cell includes:

acquiring a downlink Pathloss value of the primary cell, or acquiring a downlink Pathloss level of the primary cell:

acquiring a downlink Pathloss value of the neighboring cell, or acquiring a downlink Pathloss level of the neighboring cell; or acquiring the Pathloss difference between the downlink of the primary cell and the downlink of the neighboring cell, or acquiring a level of the Pathloss difference between the downlink of the primary cell and the downlink of the neighboring cell.

With reference to the first possible implementation manner of the first aspect, in a fourth possible implementation manner, the measuring a downlink of a primary cell and a downlink of a neighboring cell includes:

measuring received signal code power RSCP information of the primary cell, and/or measuring RSCP information of the neighboring cell; or measuring information about an RSCP difference between the primary cell and the neighboring cell.

With reference to the fourth possible implementation manner of the first aspect, in a fifth possible implementation manner, the acquiring at least one type of downlink quality information of the primary cell and downlink quality information of the neighboring cell includes:

acquiring an RSCP value of the primary cell, or acquiring an RSCP level of the neighboring cell;

acquiring an RSCP value of the neighboring cell, or acquiring an RSCP level of the neighboring cell; or acquiring the RSCP difference between the primary cell and the neighboring cell, or acquiring a level of the RSCP difference between the primary cell and the neighboring cell.

With reference to the first aspect, or the first possible implementation manner of the first aspect, or the second possible implementation manner of the first aspect, or the third possible implementation manner of the first aspect, or the fourth possible implementation manner of the first aspect, or the fifth possible implementation manner of the first aspect, in a sixth possible implementation manner, the reporting the downlink quality information to a network-side device includes:

sending the downlink quality information to a base station; or sending the downlink quality information to a radio network controller RNC, so that the RNC forwards the downlink quality information to a base station.

With reference to the six possible implementation manner of the first aspect, in a seventh possible implementation manner, when the downlink quality information is sent to the base station, the sending the downlink quality information to a base station includes:

adding the downlink quality information into a MAC-i protocol data unit PDU, and sending the MAC-i PDU to the base station; or adding the downlink quality information into an SI packet, and sending the SI packet to the base station.

With reference to the seventh possible implementation manner of the first aspect, in an eighth possible implementation manner, when the downlink quality information is added into the SI packet and sent to the base station, the adding the downlink quality information into an SI packet, and sending the SI packet to the base station includes:

adding the downlink quality information into a specified bit of the SI packet, and sending, to the base station, the SI packet that carries the downlink quality information; or adding the downlink quality information into a UPH field of the SI packet, and sending, to the base station, the SI packet that carries the downlink quality information.

With reference to the first aspect, or the first possible implementation manner of the first aspect, or the second possible implementation manner of the first aspect, or the third possible implementation manner of the first aspect, or the fourth possible implementation manner of the first aspect, or the fifth possible implementation manner of the first aspect, or the sixth possible implementation manner of the first aspect, or the seventh possible implementation manner of the first aspect, or the eighth possible implementation manner of the first aspect, in a ninth possible implementation manner, after the reporting the downlink quality information to a network-side device, the method further includes:

receiving power control information that is sent by the base station according to the downlink quality information, and determining an uplink channel transmit power according to the power control information.

With reference to the ninth possible implementation manner of the first aspect, in a tenth possible implementation manner, the receiving power control information that is sent by the base station, and determining an uplink channel transmit power according to the power control information includes:

receiving the power control information sent by the base station, where the power control information is an absolute power value that is of a current uplink channel transmit power of user equipment UE and that is determined by the base station; and determining the absolute power value as the uplink channel transmit power.

With reference to the ninth possible implementation manner of the first aspect, in an eleventh possible implementation manner, the receiving power control information that is sent by the base station, and determining an uplink channel transmit power according to the power control information includes:

receiving the power control information sent by the base station, where the power control information is a relative power value that is of a current uplink channel transmit power of a UE and that is determined by the base station, and the relative power value is a ratio of the uplink channel transmit power of the UE to a control channel transmit power of the UE; and determining the uplink channel transmit power according to the relative power value and the control channel transmit power of the UE.

With reference to the ninth possible implementation manner of the first aspect, or the tenth possible implementation manner of the first aspect, or the eleventh possible implementation manner of the first aspect, in a twelfth possible implementation manner, the receiving power control information that is sent by the base station includes:

receiving, in a same coding and decoding manner as an E-AGCH channel, the power control information sent by the base station.

With reference to the ninth possible implementation manner of the first aspect, or the tenth possible implementation manner of the first aspect, or the eleventh possible implementation manner of the first aspect, or the twelfth possible implementation manner of the first aspect, in a thirteenth possible implementation manner, after the receiving power control information that is sent by the base station, and determining an uplink channel transmit power according to the power control information, the method further includes:

sending uplink data to the base station by using the uplink channel transmit power, which specifically includes:

determining a maximum power offset according to the uplink channel transmit power, where the maximum power offset is a maximum ratio of the current uplink channel transmit power of the UE to the control channel transmit power; and performing enhanced dedicated channel transport format combination E-TFC selection according to the maximum power offset so as to determine a transport format of the uplink data, and transmitting the uplink data in the determined transport format.

With reference to the thirteenth possible implementation manner of the first aspect, in a fifteenth possible implementation manner, the performing E-TFC selection according to the maximum power offset so as to determine a transport format of the uplink data includes:

performing E-TFC selection according to the maximum power offset and by using the following formula:

$$\left\lfloor K_{e,ref,m} \cdot \frac{A_{ed,a}^2}{L_{e,ref,m} \cdot A_{ed,m}^2 \cdot 10^{\Delta harq/10}} \right\rfloor,$$

where $A_{ed, a}$ is the maximum power offset determined by the UE, $K_{e,ref,m}$ is a transport block set TBS of the $m^{th}$ piece of reference E-TFC, $L_{e,ref,m}$ is a quantity of enhanced dedicated physical data channels E-DPDCHs of the $m^{th}$ piece of reference E-TFC, $A_{ed,m}$ is a quantized amplitude ratio of the $m^{th}$ piece of reference E-TFC, and harq is a hybrid automatic repeat request HARQ offset.

With reference to the ninth possible implementation manner of the first aspect, or the tenth possible implementation manner of the first aspect, or the eleventh possible implementation manner of the first aspect, or the twelfth possible implementation manner of the first aspect, or the thirteenth possible implementation manner of the first aspect, or the fourteenth possible implementation manner of the first aspect, in a fifteenth possible implementation manner, the method further includes:

receiving instruction signaling that is sent by the base station at an upper layer, where the instruction signaling is used to instruct the UE to determine, when the power control information is not acquired currently at a current transmission time interval TTI, the uplink channel transmit power according to power control information that is previously acquired.

According to a second aspect, an embodiment of the present invention provides a method for acquiring downlink quality information, where the method includes:

acquiring, by a base station, downlink quality information sent by user equipment UE, where the downlink quality information includes at least one type of downlink quality information of a primary cell and downlink quality information of a neighboring cell.

In a first possible implementation manner, the acquiring, by a base station, downlink quality information sent by UE specifically includes:

acquiring downlink transmission pathloss Pathloss information of the primary cell, and/or acquiring downlink Pathloss information of the neighboring cell; or acquiring information about a Pathloss difference between downlink Pathloss information of the primary cell and downlink Pathloss information of the neighboring cell.

With reference to the first possible implementation manner of the second aspect, in a second possible implementation manner, the acquiring downlink Pathloss information of the primary cell includes: acquiring a downlink Pathloss value of the primary cell, or acquiring a downlink Pathloss level of the primary cell:

the acquiring downlink Pathloss information of the neighboring cell includes: acquiring a downlink Pathloss value of the neighboring cell, or acquiring a downlink Pathloss level of the neighboring cell; or the acquiring information about a Pathloss difference between downlink Pathloss information of the primary cell and downlink Pathloss information of the neighboring cell includes: acquiring the Pathloss difference between the downlink Pathloss information of the primary cell and the downlink Pathloss information of the neighboring cell, or acquiring a level of the Pathloss difference between the downlink Pathloss information of the primary cell and the downlink Pathloss information of the neighboring cell.

With reference to the second aspect, in a third possible implementation manner, the acquiring, by a base station, downlink quality information sent by UE includes:

acquiring received signal code power RSCP information of the primary cell, and/or acquiring RSCP information of the neighboring cell; or acquiring information about an RSCP difference between RSCP information of the primary cell and RSCP information of the neighboring cell.

With reference to the third possible implementation manner of the second aspect, in a fourth possible implementation manner, the acquiring received signal code power RSCP information of the primary cell includes: acquiring an RSCP value of the primary cell, or acquiring an RSCP level of the neighboring cell;

the acquiring RSCP information of the neighboring cell includes: acquiring an RSCP value of the neighboring cell, or acquiring an RSCP level of the neighboring cell; or the acquiring information about an RSCP difference between RSCP information of the primary cell and RSCP information of the neighboring cell includes: acquiring the RSCP difference between the primary cell and the neighboring cell, or acquiring a level of the RSCP difference between the primary cell and the neighboring cell.

With reference to the second aspect, or the first possible implementation manner of the second aspect, or the second possible implementation manner of the second aspect, or the third possible implementation manner of the second aspect, or the fourth possible implementation manner of the second aspect, in a fifth possible implementation manner, the acquiring downlink quality information includes:

receiving the downlink quality information reported by the UE; or receiving downlink quality information sent by a radio network controller RNC.

With reference to the fifth possible implementation manner of the second aspect, in a sixth possible implementation manner, the receiving the downlink quality information reported by the UE includes:

receiving an enhanced uplink protocol data unit MAC-i PDU reported by the UE, where the MAC-i PDU carries the downlink quality information; and acquiring the downlink quality information from the MAC-i PDU.

With reference to the fifth possible implementation manner of the second aspect, in a seventh possible implementation manner, the receiving the downlink quality information reported by the UE includes:

receiving an SI packet reported by the UE, where the SI packet carries the downlink quality information; and acquiring the downlink quality information from the SI packet.

With reference to the seventh possible implementation manner of the second aspect, in an eighth possible implementation manner, the acquiring the downlink quality information from the SI packet includes:

acquiring the downlink quality information from a specified bit of the SI packet, or acquiring the downlink quality information from a UPH field of the SI packet, where the specified bit of the SI packet carries the downlink quality information, or the UPH field of the SI packet carries the downlink quality information.

With reference to the second aspect, or the first possible implementation manner of the second aspect, or the second possible implementation manner of the second aspect, or the third possible implementation manner of the second aspect, or the fourth possible implementation manner of the second aspect, or the fifth possible implementation manner of the second aspect, or the sixth possible implementation manner of the second aspect, or the seventh possible implementation manner of the second aspect, or the eighth possible implementation manner of the second aspect, in a ninth possible implementation manner, after the acquiring, by a base station, downlink quality information sent by user equipment UE, the method further includes:

determining power control information according to the downlink quality information, and sending the power control information to the UE, so that the UE determines an uplink channel transmit power according to the power control information.

With reference to the ninth possible implementation manner of the second aspect, in a tenth possible implementation manner, the determining power control information according to the downlink quality information includes:

determining an absolute power value of the uplink channel transmit power of the UE according to the downlink quality information, and determining the absolute power value as the power control information; or determining a relative power value of the uplink channel transmit power of the UE according to the downlink quality information, and determining the relative power value as the power control information, where the relative power value is a ratio of the uplink channel transmit power of the UE to a control channel transmit power of the UE.

With reference to the ninth possible implementation manner or the tenth possible implementation manner of the second aspect, in an eleventh possible implementation manner, the sending the power control information to the user equipment UE includes:

sending the power control information to the UE in a same coding and decoding manner as an E-AGCH channel.

With reference to the eleventh possible implementation manner of the second aspect, in a twelfth possible implementation manner, the sending the power control information to the user equipment UE, so that the UE determines an uplink channel transmit power according to the power control information includes:

sending the power control information to the UE, so that the UE determines the uplink channel transmit power according to the power control information and performs E-TFC selection according to the uplink channel transmit power.

With reference to the ninth possible implementation manner of the second aspect, or the tenth possible implementation manner of the second aspect, or the eleventh possible implementation manner of the second aspect, or the twelfth possible implementation manner of the second aspect, in a thirteenth possible implementation manner of the second aspect, the method further includes:

setting instruction signaling at an upper layer, and sending the instruction signaling to the UE, where the instruction signaling is used to instruct the UE to determine, when the power control information is not acquired at a current transmission time interval TTI, the uplink channel transmit power according to power control information that is previously acquired.

According to a third aspect, an embodiment of the present invention provides an apparatus for acquiring downlink quality information, where the apparatus includes:

a measuring unit, configured to measure the downlink quality information; and a sending unit, configured to report the downlink quality information measured by the measuring unit to a network-side device.

In a first possible implementation manner, the measuring unit is specifically configured to: measure a downlink of a primary cell and a downlink of a neighboring cell, and acquire at least one type of downlink quality information of the primary cell and downlink quality information of the neighboring cell.

With reference to the first possible implementation manner of the third aspect, in a second possible implementation manner, the measuring unit is configured to: measure downlink transmission pathloss Pathloss information of the primary cell, and/or measure downlink Pathloss information of the neighboring cell;

or the measuring unit is configured to measure information about a Pathloss difference between the downlink of the primary cell and the downlink of the neighboring cell.

With reference to the second possible implementation manner of the third aspect, in a third possible implementation manner, the measuring unit is configured to: acquire a downlink Pathloss value of the primary cell, or acquire a downlink Pathloss level of the primary cell;

the measuring unit is further configured to: acquire a downlink Pathloss value of the neighboring cell, or acquire a downlink Pathloss level of the neighboring cell; or the measuring unit is further configured to: acquire the Pathloss difference between the downlink of the primary cell and the downlink of the neighboring cell, or acquire a level of the Pathloss difference between the downlink of the primary cell and the downlink of the neighboring cell.

With reference to the first possible implementation manner of the third aspect, in a fourth possible implementation manner, the measuring unit is specifically configured to: measure received signal code power RSCP information of the primary cell, and/or measure RSCP information of the neighboring cell; or the measuring unit is further configured to measure information about an RSCP difference between the primary cell and the neighboring cell.

With reference to the fourth possible implementation manner of the third aspect, in a fifth possible implementation manner, the measuring unit is configured to: acquire an RSCP value of the primary cell, or acquire an RSCP level of the neighboring cell;

the measuring unit is further configured to: acquire an RSCP value of the neighboring cell, or acquire an RSCP level of the neighboring cell; or the measuring unit is further configured to: acquire the RSCP difference between the primary cell and the neighboring cell, or acquire a level of the RSCP difference between the primary cell and the neighboring cell.

With reference to the third aspect, or the first possible implementation manner of the third aspect, or the second possible implementation manner of the third aspect, or the third possible implementation manner of the third aspect, or the fourth possible implementation manner of the third aspect, or the fifth possible implementation manner of the third aspect, in a sixth possible implementation manner. the sending unit is configured to send the downlink quality information to a base station; or the sending unit is further configured to send the downlink quality information to a radio network controller RNC, so that the RNC forwards the downlink quality information to a base station.

With reference to the sixth possible implementation manner of the third aspect, in a seventh possible implementation manner, the sending unit is specifically configured to: when sending the downlink quality information to the base station, add the downlink quality information into a MAC-i protocol data unit PDU and send the MAC-i PDU to the base station, or add the downlink quality information into an SI packet and send the downlink quality information to the base station.

With reference to the seventh possible implementation manner of the third aspect, in an eighth possible implementation manner, the sending unit is specifically configured to: when adding the downlink quality information into the SI packet and sending the SI packet to the base station, add the downlink quality information into a specified bit of the SI packet, and send, to the base station, the SI packet that carries the downlink quality information; or the sending unit is further configured to: add the downlink quality information into a UPH field of the SI packet, and send, to the base station, the SI packet that carries the downlink quality information.

With reference to the third aspect, or the first possible implementation manner of the third aspect, or the second possible implementation manner of the third aspect, or the third possible implementation manner of the third aspect, or the fourth possible implementation manner of the third aspect, or the fifth possible implementation manner of the third aspect, or the sixth possible implementation manner of the third aspect, or the seventh possible implementation manner of the third aspect, or the eighth possible implementation manner of the third aspect, in a ninth possible implementation manner, the apparatus further includes:

a receiving unit, configured to receive power control information that is sent by the base station according to the downlink quality information; and a determining unit, configured to determine an uplink channel transmit power according to the power control information received by the receiving unit.

With reference to the ninth possible implementation manner of the third aspect, in a tenth possible implementation manner, the power control information received by the receiving unit is an absolute power value that is of a current uplink channel transmit power of user equipment UE and that is determined by the base station; and the determining unit is configured to determine the absolute power value received by the receiving unit as the uplink channel transmit power.

With reference to the ninth possible implementation manner of the third aspect, in an eleventh possible implementation manner, the power control information received by the receiving unit is a relative power value that is of a current uplink channel transmit power of a UE and that is determined by the base station, and the relative power value is a ratio of the uplink channel transmit power of the UE to a control channel transmit power of the UE; and the determining unit is configured to determine the uplink channel transmit power according to the relative power value received by the receiving unit and the control channel transmit power of the UE.

With reference to the ninth possible implementation manner of the third aspect, or the tenth possible implementation manner of the third aspect, or the eleventh possible implementation manner of the third aspect, in a twelfth possible implementation manner, the receiving unit is specifically configured to receive, in a same coding and decoding manner as an E-AGCH channel, the power control information sent by the base station.

With reference to the ninth possible implementation manner of the third aspect, or the tenth possible implementation manner of the third aspect, or the eleventh possible implementation manner of the third aspect, or the twelfth possible implementation manner of the third aspect, in a thirteenth possible implementation manner, the sending unit is further configured to send uplink data to the base station by using the uplink channel transmit power determined by the determining unit, where the sending unit is specifically configured to: determine a maximum power offset according to the uplink channel transmit power determined by the determining unit; perform enhanced dedicated channel transport format combination E-TFC selection according to the maximum power offset so as to determine a transport format of the uplink data; and transmit the uplink data in the determined transport format, where the maximum power offset is a maximum ratio of the current uplink channel transmit power of the UE to the control channel transmit power.

With reference to the thirteenth possible implementation manner of the third aspect, in a fifteenth possible implementation manner, the sending unit is specifically configured to perform E-TFC selection according to the maximum power offset and by using the following formula:

$$\left[ K_{e,ref,m} \cdot \frac{A_{ed,a}^2}{L_{e,ref,m} \cdot A_{ed,m}^2 \cdot 10^{\Delta harq/10}} \right],$$

where $A_{ed,a}$ is the maximum power offset determined by the UE, $K_{e,ref,m}$ is a transport block set TBS of the $m^{th}$ piece of reference E-TFC, $L_{e,ref,m}$ is a quantity of enhanced dedicated physical data channels E-DPDCHs of the $m^{th}$ piece of reference E-TFC, $A_{ed,m}$ is a quantized amplitude ratio of the $m^{th}$ piece of reference E-TFC, and harq is a hybrid automatic repeat request HARQ offset.

With reference to the ninth possible implementation manner of the third aspect, or the tenth possible implementation manner of the third aspect, or the eleventh possible implementation manner of the third aspect, or the twelfth possible implementation manner of the third aspect, or the thirteenth possible implementation manner of the third aspect, or the fourteenth possible implementation manner of the third aspect, in a fifteenth possible implementation manner, the receiving unit is further configured to receive instruction signaling that is sent by the base station at an upper layer, where the instruction signaling is used to instruct the UE to determine, when the power control information is not acquired currently at a current transmission time interval TTI, the uplink channel transmit power according to power control information that is previously acquired.

According to a fourth aspect, an embodiment of the present invention provides an apparatus for acquiring downlink quality information, where the apparatus includes:

an acquiring unit, configured to acquire downlink quality information sent by user equipment UE, where the downlink quality information includes at least one type of downlink quality information of a primary cell and downlink quality information of a neighboring cell.

In a first possible implementation manner, the acquiring unit is specifically configured to: acquire downlink transmission pathloss Pathloss information of the primary cell, and/or acquire downlink Pathloss information of the neighboring cell; or the acquiring unit is specifically configured to acquire information about a Pathloss difference between downlink Pathloss information of the primary cell and downlink Pathloss information of the neighboring cell.

With reference to the first possible implementation manner of the fourth aspect, in a second possible implementation manner, the acquiring unit is configured to: when acquiring the downlink Pathloss information of the primary cell, acquire a downlink Pathloss value of the primary cell, or acquire a downlink Pathloss level of the primary cell;

the acquiring unit is further configured to: when acquiring the downlink Pathloss information of the neighboring cell, acquire a downlink Pathloss value of the neighboring cell, or acquire a downlink Pathloss level of the neighboring cell; or the acquiring unit is further configured to: when acquiring the information about the Pathloss difference between the downlink Pathloss information of the primary cell and the downlink Pathloss information of the neighboring cell, acquire the Pathloss difference between the downlink Pathloss information of the primary cell and the downlink Pathloss information of the neighboring cell, or acquire a level of the Pathloss difference between the downlink Pathloss information of the primary cell and the downlink Pathloss information of the neighboring cell.

With reference to the fourth aspect, in a third possible implementation manner, the acquiring unit is specifically configured to: acquire received signal code power RSCP information of the primary cell, and/or acquire RSCP information of the neighboring cell; or the acquiring unit is specifically configured to acquire information about an RSCP difference between RSCP information of the primary cell and RSCP information of the neighboring cell.

With reference to the third possible implementation manner of the fourth aspect, in a fourth possible implementation manner, the acquiring unit is configured to: when acquiring the received signal code power RSCP information of the primary cell, acquire an RSCP value of the primary cell, or acquire an RSCP level of the neighboring cell;

the acquiring unit is further configured to: when acquiring the RSCP information of the neighboring cell, acquire an RSCP value of the neighboring cell, or acquire an RSCP level of the neighboring cell; or the acquiring unit is further configured to: when acquiring the information about the RSCP difference between the RSCP information of the primary cell and the RSCP information of the neighboring cell, acquire the RSCP difference between the primary cell and the neighboring cell, or acquire a level of the RSCP difference between the primary cell and the neighboring cell.

With reference to the fourth aspect, or the first possible implementation manner of the fourth aspect, or the second possible implementation manner of the fourth aspect, or the third possible implementation manner of the fourth aspect, or the fourth possible implementation manner of the fourth aspect, in a fifth possible implementation manner, the acquiring unit includes a first receiving module or a second receiving module, where the first receiving module is configured to receive the downlink quality information reported by the UE; or the second receiving module is configured to receive downlink quality information sent by a radio network controller RNC.

With reference to the fifth possible implementation manner of the fourth aspect, in a sixth possible implementation manner, the first receiving module is specifically configured to receive an enhanced uplink protocol data unit MAC-i PDU reported by the UE, where the MAC-i PDU carries the downlink quality information; and the acquiring unit is configured to acquire the downlink quality information from the MAC-i PDU received by the first receiving module.

With reference to the fifth possible implementation manner of the fourth aspect, in a seventh possible implementation manner, the first receiving module is specifically configured to receive an SI packet reported by the UE, where the SI packet carries the downlink quality information; and the acquiring unit is configured to acquire the downlink quality information from the SI packet received by the first receiving module.

With reference to the seventh possible implementation manner of the fourth aspect, in an eighth possible implementation manner, the acquiring unit is specifically configured to: acquire the downlink quality information from a specified bit of the SI packet, or acquire the downlink quality information from a UPH field of the SI packet, where the specified bit of the SI packet carries the downlink quality information, or the UPH field of the SI packet carries the downlink quality information.

With reference to the fourth aspect, or the first possible implementation manner of the fourth aspect, or the second possible implementation manner of the fourth aspect, or the third possible implementation manner of the fourth aspect, or the fourth possible implementation manner of the fourth aspect, or the fifth possible implementation manner of the fourth aspect, or the sixth possible implementation manner of the fourth aspect, or the seventh possible implementation manner of the fourth aspect, or the eighth possible implementation manner of the fourth aspect, in a ninth possible implementation manner, the apparatus further includes:

a determining unit, configured to determine power control information according to the downlink quality information acquired by the acquiring unit; and a sending unit, configured to send the power control information determined by the determining unit to the UE, so that the UE determines an uplink channel transmit power according to the power control information.

With reference to the ninth possible implementation manner of the fourth aspect, in a tenth possible implementation manner, the determining unit is specifically configured to: determine an absolute power value of the uplink channel transmit power of the UE according to the downlink quality information acquired by the acquiring unit, and determine the absolute power value as the power control information; or the determining unit is further specifically configured to: determine a relative power value of the uplink channel transmit power of the UE according to the downlink quality information, and determine the relative power value as the power control information, where the relative power value is a ratio of the uplink channel transmit power of the UE to a control channel transmit power of the UE.

With reference to the ninth possible implementation manner or the tenth possible implementation manner of the fourth aspect, in an eleventh possible implementation manner, the sending unit is specifically configured to send the power control information determined by the determining unit to the UE in a same coding and decoding manner as an E-AGCH channel.

With reference to the eleventh possible implementation manner of the fourth aspect, in a twelfth possible implementation manner, the power control information sent by the sending unit is used by the UE to determine the uplink channel transmit power according to the power control information and perform E-TFC selection according to the uplink channel transmit power.

With reference to the ninth possible implementation manner of the fourth aspect, or the tenth possible implementation manner of the fourth aspect, or the eleventh possible implementation manner of the fourth aspect, or the twelfth possible implementation manner of the fourth aspect, in a thirteenth possible implementation manner, the determining unit is further configured to set instruction signaling at an upper layer; and the sending unit is further configured to send the instruction signaling determined by the determining unit to the UE, where the instruction signaling is used to instruct the UE to determine, when the power control information is not acquired at a current transmission time interval TTI, the uplink channel transmit power according to power control information that is previously acquired.

According to a fifth aspect, an embodiment of the present invention provides user equipment, where the user equipment includes:

a processor, configured to measure downlink quality information; and a transmitter, configured to report the downlink quality information measured by the processor to a network-side device.

In a first possible implementation manner, the processor is specifically configured to: measure a downlink of a primary cell and a downlink of a neighboring cell, and acquire at least one type of downlink quality information of the primary cell and downlink quality information of the neighboring cell.

With reference to the first possible implementation manner of the fifth aspect, in a second possible implementation manner, the processor is configured to: measure downlink transmission pathloss Pathloss information of the primary cell, and/or measure downlink Pathloss information of the neighboring cell;

or the processor is configured to measure information about a Pathloss difference between the downlink of the primary cell and the downlink of the neighboring cell.

With reference to the second possible implementation manner of the fifth aspect, in a third possible implementation manner, the processor is configured to: acquire a downlink Pathloss value of the primary cell, or acquire a downlink Pathloss level of the primary cell;

the processor is further configured to: acquire a downlink Pathloss value of the neighboring cell, or acquire a downlink Pathloss level of the neighboring cell; or the processor is further configured to: acquire the Pathloss difference between the downlink of the primary cell and the downlink of the neighboring cell, or acquire a level of the Pathloss difference between the downlink of the primary cell and the downlink of the neighboring cell.

With reference to the first possible implementation manner of the fifth aspect, in a fourth possible implementation manner, the processor is specifically configured to: measure received signal code power RSCP information of the primary cell, and/or measure RSCP information of the neighboring cell; or the processor is further configured to measure information about an RSCP difference between the primary cell and the neighboring cell.

With reference to the fourth possible implementation manner of the fifth aspect, in a fifth possible implementation manner, the processor is configured to: acquire an RSCP value of the primary cell, or acquire an RSCP level of the neighboring cell;

the processor is further configured to: acquire an RSCP value of the neighboring cell, or acquire an RSCP level of the neighboring cell; or the processor is further configured to: acquire the RSCP difference between the primary cell and the neighboring cell, or acquire a level of the RSCP difference between the primary cell and the neighboring cell.

With reference to the fifth aspect, or the first possible implementation manner of the fifth aspect, or the second possible implementation manner of the fifth aspect, or the third possible implementation manner of the fifth aspect, or the fourth possible implementation manner of the fifth aspect, or the fifth possible implementation manner of the fifth aspect, in a sixth possible implementation manner, the transmitter is configured to send the downlink quality information to a base station; or the transmitter is further configured to send the downlink quality information to a radio network controller RNC, so that the RNC forwards the downlink quality information to a base station.

With reference to the sixth possible implementation manner of the fifth aspect, in a seventh possible implementation manner, the transmitter is specifically configured to: when sending the downlink quality information to the base station, add the downlink quality information into a MAC-i protocol data unit PDU and send the MAC-i PDU to the base station, or add the downlink quality information into an SI packet and send the SI packet to the base station.

With reference to the seventh possible implementation manner of the fifth aspect, in an eighth possible implementation manner, the transmitter is specifically configured to: when adding the downlink quality information into the SI packet and sending the SI packet to the base station, add the downlink quality information into a specified bit of the SI packet, and send, to the base station, the SI packet that carries the downlink quality information; or the transmitter is further configured to: add the downlink quality information into a UPH field of the SI packet, and send, to the base station, the SI packet that carries the downlink quality information.

With reference to the fifth aspect, or the first possible implementation manner of the fifth aspect, or the second possible implementation manner of the fifth aspect, or the third possible implementation manner of the fifth aspect, or the fourth possible implementation manner of the fifth aspect, or the fifth possible implementation manner of the fifth aspect, or the sixth possible implementation manner of the fifth aspect, or the seventh possible implementation manner of the fifth aspect, or the eighth possible implementation manner of the fifth aspect, in a ninth possible implementation manner, the user equipment further includes:

a receiver, configured to receive power control information that is sent by the base station according to the downlink quality information; and the processor is further configured to determine an uplink channel transmit power according to the power control information received by the receiver.

With reference to the ninth possible implementation manner of the fifth aspect, in a tenth possible implementation manner, the power control information received by the receiver is an absolute power value that is of a current uplink channel transmit power of the user equipment UE and that is determined by the base station; and the processor is configured to determine the absolute power value received by the receiver as the uplink channel transmit power.

With reference to the ninth possible implementation manner of the fifth aspect, in an eleventh possible implementation manner, the power control information received by the receiver is a relative power value that is of a current uplink channel transmit power of the UE and that is determined by the base station, and the relative power value is a ratio of the uplink channel transmit power of the UE to a control channel transmit power of the UE; and the processor is configured to determine the uplink channel transmit power according to the relative power value received by the receiver and the control channel transmit power of the UE.

With reference to the ninth possible implementation manner of the fifth aspect, or the tenth possible implementation manner of the fifth aspect, or the eleventh possible implementation manner of the fifth aspect, in a twelfth possible implementation manner, the receiver is specifically configured to receive, in a same coding and decoding manner as an E-AGCH channel, the power control information sent by the base station.

With reference to the ninth possible implementation manner of the fifth aspect, or the tenth possible implementation manner of the fifth aspect, or the eleventh possible implementation manner of the fifth aspect, or the twelfth possible implementation manner of the fifth aspect, in a thirteenth possible implementation manner, the transmitter is further configured to send uplink data to the base station by using the uplink channel transmit power determined by the processor, where the transmitter is specifically configured to: determine a maximum power offset according to the uplink channel transmit power determined by the processor; perform enhanced dedicated channel transport format combination E-TFC selection according to the maximum power offset so as to determine a transport format of the uplink data; and transmit the uplink data in the determined transport format, where the maximum power offset is a maximum ratio of the current uplink channel transmit power of the UE to the control channel transmit power.

With reference to the thirteenth possible implementation manner of the fifth aspect, in a fifteenth possible implementation manner, the transmitter is specifically configured to perform E-TFC selection according to the maximum power offset and by using the following formula:

$$\left[ K_{e,ref,m} \cdot \frac{A_{ed,a}^2}{L_{e,ref,m} \cdot A_{ed,m}^2 \cdot 10^{\Delta harq/10}} \right],$$

where $A_{ed,a}$ is the maximum power offset determined by the UE, $K_{e,ref,m}$ is a transport block set TBS of the $m^{th}$ piece of reference E-TFC, $L_{e,ref,m}$ is a quantity of enhanced dedicated physical data channels E-DPDCHs of the $m^{th}$ piece of reference E-TFC, $A_{ed,m}$ is a quantized amplitude ratio of the $m^{th}$ piece of reference E-TFC, and harq is a hybrid automatic repeat request HARQ offset.

With reference to the ninth possible implementation manner of the fifth aspect, or the tenth possible implementation manner of the fifth aspect, or the eleventh possible implementation manner of the fifth aspect, or the twelfth possible implementation manner of the fifth aspect, or the thirteenth possible implementation manner of the fifth aspect, or the fourteenth possible implementation manner of the fifth aspect, in a fifteenth possible implementation manner, the receiver is further configured to receive instruction signaling that is sent by the base station at an upper layer, where the instruction signaling is used to instruct the UE to determine, when the power control information is not acquired currently at a current transmission time interval TTI, the uplink channel transmit power according to power control information that is previously acquired.

According to a sixth aspect, an embodiment of the present invention provides a base station, where the base station includes:

a receiver, configured to acquire downlink quality information sent by user equipment UE, where the downlink quality information includes at least one type of downlink quality information of a primary cell and downlink quality information of a neighboring cell.

In a first possible implementation manner, the receiver is specifically configured to: acquire downlink transmission pathloss Pathloss information of the primary cell, and/or acquire downlink Pathloss information of the neighboring cell; or the receiver is specifically configured to acquire information about a Pathloss difference between downlink Pathloss information of the primary cell and downlink Pathloss information of the neighboring cell.

With reference to the first possible implementation manner of the sixth aspect, in a second possible implementation manner, the receiver is configured to: when acquiring the downlink Pathloss information of the primary cell, acquire a downlink Pathloss value of the primary cell, or acquire a downlink Pathloss level of the primary cell;

the receiver is further configured to: when acquiring the downlink Pathloss information of the neighboring cell, acquire a downlink Pathloss value of the neighboring cell, or acquire a downlink Pathloss level of the neighboring cell; or the receiver is further configured to: when acquiring the information about the Pathloss difference between the downlink Pathloss information of the primary cell and the downlink Pathloss information of the neighboring cell, acquire the Pathloss difference between the downlink Pathloss information of the primary cell and the downlink Pathloss information of the neighboring cell, or acquire a level of the Pathloss difference between the downlink Pathloss information of the primary cell and the downlink Pathloss information of the neighboring cell.

With reference to the sixth aspect, in a third possible implementation manner, the receiver is specifically configured to: acquire received signal code power RSCP information of the primary cell, and/or acquire RSCP information of the neighboring cell; or the receiver is specifically configured to acquire information about an RSCP difference between RSCP information of the primary cell and RSCP information of the neighboring cell.

With reference to the third possible implementation manner of the sixth aspect, in a fourth possible implementation manner, the receiver is configured to: when acquiring the received signal code power RSCP information of the primary cell, acquire an RSCP value of the primary cell, or acquire an RSCP level of the neighboring cell;

the receiver is further configured to: when acquiring the RSCP information of the neighboring cell, acquire an RSCP value of the neighboring cell, or acquire an RSCP level of the neighboring cell; or the receiver is further configured to: when acquiring the information about the RSCP difference between the RSCP information of the primary cell and the RSCP information of the neighboring cell, acquire the RSCP difference between the primary cell and the neighboring cell, or acquire a level of the RSCP difference between the primary cell and the neighboring cell.

With reference to the sixth aspect, or the first possible implementation manner of the sixth aspect, or the second possible implementation manner of the sixth aspect, or the third possible implementation manner of the sixth aspect, or the fourth possible implementation manner of the sixth aspect, in a fifth possible implementation manner, the receiver is configured to receive the downlink quality information reported by the UE; or the receiver is configured to receive downlink quality information sent by a radio network controller RNC.

With reference to the fifth possible implementation manner of the sixth aspect, in a sixth possible implementation manner, the receiver is specifically configured to: when receiving the downlink quality information reported by the UE, receive an enhanced uplink protocol data unit MAC-i PDU reported by the UE, and acquire the downlink quality information from the MAC-i PDU, where the MAC-i PDU carries the downlink quality information.

With reference to the fifth possible implementation manner of the sixth aspect, in a seventh possible implementation manner, the receiver is specifically configured to receive an SI packet reported by the UE, and acquire the downlink quality information from the SI packet, where the SI packet carries the downlink quality information.

With reference to the seventh possible implementation manner of the sixth aspect, in an eighth possible implementation manner, the receiver is specifically configured to: acquire the downlink quality information from a specified bit of the SI packet, or acquire the downlink quality information from a UPH field of the SI packet, where the specified bit of the SI packet carries the downlink quality information, or the UPH field of the SI packet carries the downlink quality information.

With reference to the sixth aspect, or the first possible implementation manner of the sixth aspect, or the second possible implementation manner of the sixth aspect, or the third possible implementation manner of the sixth aspect, or the fourth possible implementation manner of the sixth aspect, or the fifth possible implementation manner of the sixth aspect, or the sixth possible implementation manner of the sixth aspect, or the seventh possible implementation manner of the sixth aspect, or the eighth possible implementation manner of the sixth aspect, in a ninth possible implementation manner, the base station further includes:

a processor, configured to determine power control information according to the downlink quality information acquired by the receiver; and a transmitter, configured to send the power control information determined by the processor to the UE, so that the UE determines an uplink channel transmit power according to the power control information.

With reference to the ninth possible implementation manner of the sixth aspect, in a tenth possible implementation manner, the processor is specifically configured to: determine an absolute power value of the uplink channel transmit power of the UE according to the downlink quality information acquired by the receiver, and determine the absolute power value as the power control information; or the processor is further specifically configured to: determine a relative power value of the uplink channel transmit power of the UE according to the downlink quality information, and determine the relative power value as the power control information, where the relative power value is a ratio of the uplink channel transmit power of the UE to a control channel transmit power of the UE.

With reference to the ninth possible implementation manner or the tenth possible implementation manner of the sixth aspect, in an eleventh possible implementation manner, the transmitter is specifically configured to send the power control information determined by the processor to the UE in a same coding and decoding manner as an E-AGCH channel.

With reference to the eleventh possible implementation manner of the sixth aspect, in a twelfth possible implementation manner, the power control information sent by the transmitter is used by the UE to determine the uplink channel transmit power according to the power control information and perform E-TFC selection according to the uplink channel transmit power.

With reference to the ninth possible implementation manner of the sixth aspect, or the tenth possible implementation manner of the sixth aspect, or the eleventh possible implementation manner of the sixth aspect, or the twelfth possible implementation manner of the sixth aspect, in a thirteenth possible implementation manner, the processor is further configured to set instruction signaling at an upper layer; and the transmitter is further configured to send the instruction signaling set by the processor to the UE, where the instruction signaling is used to instruct the UE to determine, when the power control information is not acquired at a current transmission time interval TTI, the uplink channel transmit power according to power control information that is previously acquired.

According to the method and the apparatus for acquiring downlink quality information that are provided in the embodiments, a UE measures the downlink quality information, and reports the downlink quality information obtained by means of measurement to a network-side device. Compared with the prior art, by using the method provided in the embodiments, a base station of a primary cell may acquire the downlink quality information, and may further determine, according to the downlink quality information, a level of interference caused by the UE to a neighboring cell.

BRIEF DESCRIPTION OF DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Embodiment 1

This embodiment of the present invention provides a method for acquiring downlink quality information, which may be implemented by a UE, and the UE may be any terminal device, such as a mobile phone, a computer, and a PAD, that may communicate with a base station.

Figure 1:
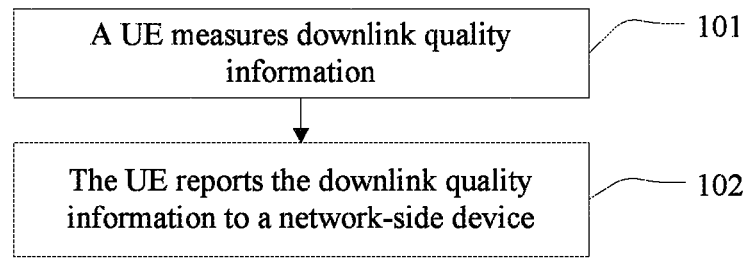
FIG. 1 is a schematic flowchart of a method for acquiring downlink quality information according to Embodiment 1 of the present invention.

As shown in FIG. 1, the method for acquiring downlink quality information provided in this embodiment includes:

101. The UE measures the downlink quality information.

Specifically, the UE needs to measure a downlink of a primary cell and a downlink of a neighboring cell, and acquire at least one type of downlink quality information of the primary cell and downlink quality information of the neighboring cell. The primary cell is a serving cell of the UE, the neighboring cell is a non-serving cell of the UE, and the neighboring cell and the primary cell are adjacent to each other.

Generally, the UE has at least one neighboring cell.

102. The UE reports the downlink quality information to a network-side device.

The network-side device includes at least a base station of the primary cell and/or an RNC (radio network controller) of the base station of the primary cell. Specifically, the UE may directly send the downlink quality information to the base station of the primary cell, or the UE may send the downlink quality information to the RNC of the base station of the primary cell, and the RNC forwards the downlink quality information to the base station of the primary cell.

It should be noted that the base station of the primary cell may determine, according to the downlink quality information reported by the UE, a level of interference caused by the UE to the neighboring cell. Specifically, the base station of the primary cell may determine a geographic location of the UE according to the downlink quality information reported by the UE. In a mobile communications system, because a location of a base station is fixed, the base station of the primary cell may determine a distance between the UE and a base station of the neighboring cell according to the downlink quality information reported by the UE, and further determine the level of the interference caused by the UE to the neighboring cell.

According to the method for acquiring downlink quality information that is provided in this embodiment, a UE measures the downlink quality information, and reports the downlink quality information obtained by means of measurement to a network-side device (including at least a base station of a primary cell and/or an RNC of the base station of the primary cell). Compared with the prior art, by using the method provided in this embodiment, the base station of the primary cell may acquire the downlink quality information, and may further determine, according to the downlink quality information, a level of interference caused by the UE to a neighboring cell.

On a basis of the embodiment shown in FIG. 1, this embodiment further provides the following specific implementation manners:

Step 101 specifically includes: measuring, by the UE, the downlink of the primary cell and the downlink of the neighboring cell, and acquiring at least one type of the downlink quality information of the primary cell and the downlink quality information of the neighboring cell.

According to one aspect, the downlink quality information obtained by the UE by means of measurement in this embodiment may be downlink Pathloss (transmission pathloss) information, and in step 101, the measuring, by the UE, the downlink of the primary cell and the downlink of the neighboring cell includes:

measuring, by the UE, downlink transmission pathloss Pathloss information of the primary cell, and/or measuring downlink Pathloss information of the neighboring cell; or measuring, by the UE, information about a Pathloss difference between downlink Pathloss information of the primary cell and downlink Pathloss information of the neighboring cell.

The acquiring at least one type of the downlink quality information of the primary cell and the downlink quality information of the neighboring cell includes: acquiring a downlink Pathloss value of the primary cell, or acquiring a downlink Pathloss level of the primary cell;

acquiring a downlink Pathloss value of the neighboring cell, or acquiring a downlink Pathloss level of the neighboring cell; or acquiring the Pathloss difference between the downlink Pathloss information of the primary cell and the downlink Pathloss information of the neighboring cell, or acquiring a level of the Pathloss difference between the downlink Pathloss information of the primary cell and the downlink Pathloss information of the neighboring cell.

According to another aspect, the downlink quality information measured by the UE in this embodiment may be downlink RSCP (received signal code power) information, and in step 101, the measuring, by the UE, the downlink of the primary cell and the downlink of the neighboring cell includes:

measuring, by the UE, received signal code power RSCP information of the primary cell, and/or measuring RSCP information of the neighboring cell; or measuring, by the UE, information about an RSCP difference between RSCP information of the primary cell and RSCP information of the neighboring cell.

The acquiring at least one type of the downlink quality information of the primary cell and the downlink quality information of the neighboring cell includes:

acquiring an RSCP value of the primary cell, or acquiring an RSCP level of the neighboring cell;

acquiring an RSCP value of the neighboring cell, or acquiring an RSCP level of the neighboring cell; or acquiring the RSCP difference between the primary cell and the neighboring cell, or acquiring a level of the RSCP difference between the primary cell and the neighboring cell.

In step 102, the network-side device includes the base station of the primary cell and/or the RNC of the base station of the primary cell. Specifically, step 102 may be implemented by using the following two methods:

Method 1:

The UE directly sends the downlink quality information to the base station of the primary cell.

Specifically, the UE may add the downlink quality information into an enhanced uplink protocol data unit (MAC-i PDU) and send the MAC-i PDU to the base station; or the UE may add the downlink quality information into an SI (scheduling information) packet and send the SI packet to the base station, where the UE may add the downlink quality information into a specified bit of the SI packet, and send, to the base station, the SI packet that carries the downlink quality information; or the UE may add the downlink quality information into a UPH field of the SI packet, and send, to the base station, the SI packet that carries the downlink quality information.

Method 2:

The UE may send the downlink quality information to the RNC of the base station of the primary cell, so that the RNC forwards the downlink quality information to the base station of the primary cell.

By using the foregoing Method 1 and Method 2, the UE may send the downlink quality information obtained by means of measurement to the base station of the primary cell.

Further, after step 102, the method further includes step 103, which is specifically as follows:

103. The UE receives power control information that is sent by the base station of the primary cell according to the downlink quality information, and determines an uplink channel transmit power according to the power control information.

It should be noted that the power control information is determined by the base station of the primary cell according to the level of the interference caused by the UE to the neighboring cell. Therefore, when the UE sends uplink data by using the determined uplink channel transmit power, no interference is caused to the neighboring cell, or it is ensured that when the UE sends uplink data to the base station of the primary cell by using the determined uplink channel transmit power, interference caused to the neighboring cell is within a preset acceptable range.

Specifically, step 103 may be implemented by using the following two methods:

Method 1:

S1. The UE receives the power control information sent by the base station of the primary cell, where the power control information is an absolute power value that is of the uplink channel transmit power of the UE and that is determined by the base station the primary cell.

S2. The UE determines the absolute power value as the uplink channel transmit power.

By using such a method, the UE may directly acquire the uplink channel transmit power from the power control information delivered by the base station of the primary cell, and does not need to perform excessive calculation on the power control information, and therefore, a load on a UE side is relatively low so as to facilitate implementation on the UE side.

Method 2:

S1. The UE receives the power control information sent by the base station of the primary cell, where the power control information is a relative power value that is of the uplink channel transmit power of the UE and that is determined by the base station of the primary cell, and the relative power value is a ratio of the uplink channel transmit power of the UE to a control channel transmit power of the UE.

It should be emphasized that in a mobile communications system specified by the 3GPP, such as the UMTS, a UE may acquire control channel transmit power in real time.

S2. The UE determines the uplink channel transmit power according to the relative power value and the control channel transmit power of the UE.

Because the relative power value is a ratio and may be represented by using fewer bits, by using Method 2, the base station of the primary cell occupies fewer air interface resources when sending the power control information to the UE, which can improve air interface resource utilization.

By using the foregoing two methods, the UE may implement step 103.

In an optional specific implementation manner, when performing step 103, the UE may receive, in a same coding and decoding manner as an E-AGCH (enhanced dedicated channel absolute grant channel), the power control information sent by the base station. By using such a method, the UE may receive, based on a standardized coding and decoding manner, the power control information sent by the base station so as to facilitate implementation on the UE side.

Optionally, after step 103, the method may further include step 104, which is specifically as follows:

104. The UE sends uplink data to the base station of the primary cell by using the determined uplink channel transmit power.

Specifically, step 104 may be implemented by using the following steps:

S1. The UE determines a maximum power offset according to the uplink channel transmit power, where the maximum power offset is a maximum ratio of the current uplink channel transmit power of the UE to the control channel transmit power.

S2. The UE performs E-TFC (enhanced dedicated channel transport format combination) selection according to the maximum power offset so as to determine a transport format of the uplink data, and transmits the uplink data in the determined transport format.

The specific implementation method of the foregoing step S2 may be as follows:

The UE performs E-TFC selection according to the maximum power offset and by using the following formula (1) so as to determine the transport format of the uplink data.

The formula (1) is:

$$\left\lfloor K_{e,ref,m} \cdot \frac{A_{ed,a}^2}{L_{e,ref,m} \cdot A_{ed,m}^2 \cdot 10^{\Delta harq/10}} \right\rfloor,$$

where $A_{ed,a}$ is the maximum power offset determined by the UE, $K_{e,ref,m}$ is a TBS (transport block set) of the $m^{th}$ piece of reference E-TFC, $L_{e,ref,m}$ is a quantity of E-DPDCHs (enhanced dedicated physical data channel) of the $m^{th}$ piece of reference E-TFC, $A_{ed,m}$ is a quantized amplitude ratio of the $m^{th}$ piece of reference E-TFC, and harq is an HARQ (hybrid automatic repeat request) offset.

Optionally, if the base station of the primary cell does not notify the UE of the power control information at a TTI (transmission time interval), the UE may determine the uplink channel transmit power by using the following method: the UE receives instruction signaling that is sent by the base station of the primary cell at an upper layer (such as an RRC layer), where the instruction signaling is used to instruct the UE to determine, when the power control information sent by the base station is not acquired currently at the current TTI, the uplink channel transmit power according to power control information that is previously acquired.

By performing the foregoing steps 103-104, after a UE sends downlink quality information to a base station of a primary cell, the base station of the primary cell may determine, according to the downlink quality information, a level of interference caused by the UE to a neighboring cell, and determine power control information of the UE based on the level of the interference caused by the UE to the neighboring cell. The UE acquires the power control information, so that when the UE transmits uplink data to the base station of the primary cell according to the power control information, no interference is caused to the neighboring cell, or the level of the interference caused by the UE to the neighboring cell is within an acceptable range, so that communication quality of the neighboring cell can be ensured.

Embodiment 2

This embodiment of the present invention provides a method for acquiring downlink quality information, and the method may be implemented by at least a base station or a functional module on a base station. A base station is used as an example for description in this embodiment.

Figure 2:
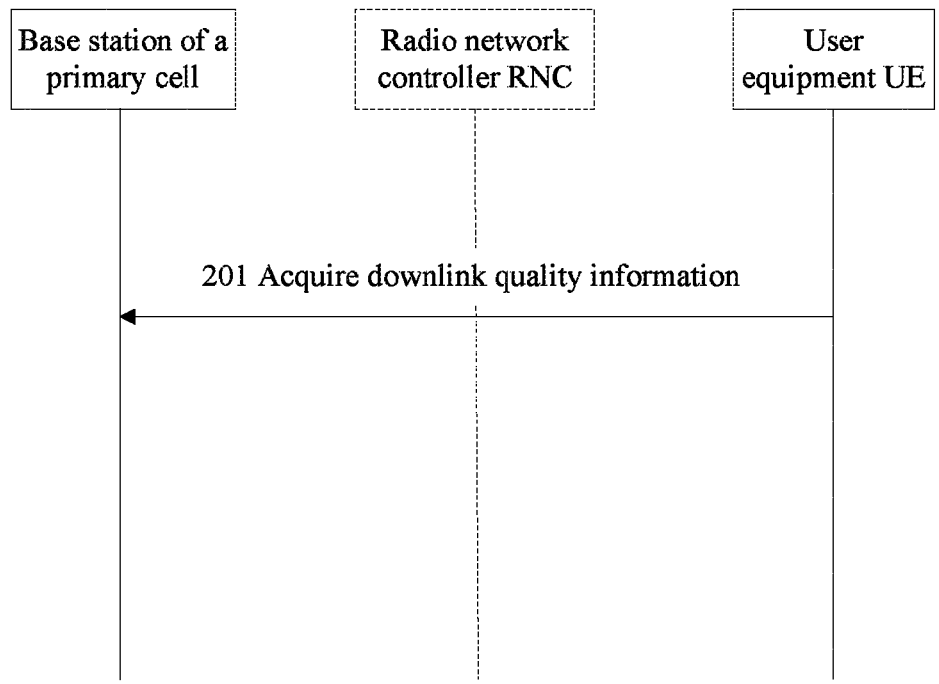
FIG. 2 is a schematic flowchart of a method for acquiring downlink quality information according to Embodiment 2 of the present invention.

As shown in FIG. 2, the method includes:

201. A base station of a primary cell acquires downlink quality information sent by user equipment UE, where the downlink quality information includes at least one type of downlink quality information of the primary cell and downlink quality information of a neighboring cell.

The primary cell is a serving cell of the UE, the neighboring cell is a non-serving cell of the UE, and the neighboring cell and the primary cell are adjacent to each other. Generally, the UE has at least one neighboring cell. It should be emphasized that the base station in this embodiment is a serving base station of the UE, that is, a base station that manages the primary cell, and may be denoted as the base station of the primary cell.

It should be noted that the base station of the primary cell may determine, according to the downlink quality information reported by the UE, a level of interference caused by the UE to the neighboring cell. Specifically, the base station of the primary cell may determine a geographic location of the UE according to the downlink quality information reported by the UE. Because a location of a base station is fixed, the base station of the primary cell may determine a distance between the UE and a base station of the neighboring cell according to the downlink quality information reported by the UE, and further determine the level of the interference caused by the UE to the neighboring cell.

According to the method for acquiring downlink quality information that is provided in this embodiment, by acquiring downlink quality information reported by a UE, a base station of a primary cell may further determine, according to the downlink quality information, a level of interference caused by the UE to a neighboring cell.

On a basis of the embodiment shown in FIG. 2, this embodiment further provides the following specific implementation manners:

According to one aspect, the downlink quality information acquired by the base station of the primary cell in this embodiment may be downlink Pathloss information.

Step 201 specifically includes: acquiring, by the base station of the primary cell, downlink Pathloss information of the primary cell, and/or acquiring downlink Pathloss information of the neighboring cell; or acquiring, by the base station of the primary cell, information about a Pathloss difference between downlink Pathloss information of the primary cell and downlink Pathloss information of the neighboring cell.

The acquiring, by the base station of the primary cell, downlink Pathloss information of the primary cell includes: acquiring, by the base station of the primary cell, a downlink Pathloss value of the primary cell, or acquiring a downlink Pathloss level of the primary cell;

the acquiring, by the base station of the primary cell, downlink Pathloss information of the neighboring cell includes: acquiring a downlink Pathloss value of the neighboring cell, or acquiring a downlink Pathloss level of the neighboring cell; or the acquiring, by the base station of the primary cell, information about a Pathloss difference between downlink Pathloss information of the primary cell and downlink Pathloss information of the neighboring cell includes: acquiring the Pathloss difference between the downlink Pathloss information of the primary cell and the downlink Pathloss information of the neighboring cell, or acquiring a level of the Pathloss difference between the downlink Pathloss information of the primary cell and the downlink Pathloss information of the neighboring cell.

According to another aspect, the downlink quality information acquired by the base station of the primary cell in this embodiment may be downlink RSCP information, and step 201 specifically includes: acquiring, by the base station of the primary cell, received signal code power RSCP information of the primary cell, and/or acquiring RSCP information of the neighboring cell; or acquiring, by the base station of the primary cell, information about an RSCP difference between RSCP information of the primary cell and RSCP information of the neighboring cell.

When the base station of the primary cell acquires the received signal code power RSCP information of the primary cell, step 201 is specifically as follows: acquiring, by the base station of the primary cell, an RSCP value of the primary cell, or acquiring an RSCP level of the neighboring cell;

when the base station of the primary cell acquires the RSCP information of the neighboring cell, step 201 is specifically as follows: acquiring, by the base station of the primary cell, an RSCP value of the neighboring cell, or acquiring an RSCP level of the neighboring cell; or when the base station of the primary cell acquires the information about the RSCP difference between the RSCP information of the primary cell and the RSCP information of the neighboring cell, step 201 is specifically as follows: acquiring, by the base station of the primary cell, the RSCP difference between the primary cell and the neighboring cell, or acquiring a level of the RSCP difference between the primary cell and the neighboring cell.

Specifically, step 201 may be implemented by using the following two methods:

Method 1:

The base station of the primary cell directly receives the downlink quality information reported by the UE.

A specific implementation manner of Method 1 is specifically implemented as follows:

S1. The base station of the primary cell receives an enhanced uplink protocol data unit (MAC-i PDU) reported by the UE, where the MAC-i PDU carries the downlink quality information.

S2. The base station of the primary cell acquires the downlink quality information from the MAC-i PDU.

Another specific implementation manner of Method 1 is specifically implemented as follows:

S1. The base station of the primary cell receives an SI packet reported by the UE, where the SI packet carries the downlink quality information.

S2. The base station of the primary cell acquires the downlink quality information from the SI packet.

A specified bit of the SI packet carries the downlink quality information, or a UPH field of the SI packet carries the downlink quality information. In this implementation manner, the base station of the primary cell may acquire the downlink quality information from the specified bit of the SI packet, or acquire the downlink quality information from the UPH field of the SI packet.

Method 2:

The base station of the primary cell receives downlink quality information sent by an RNC.

In Method 2, after obtaining the downlink quality information by means of measurement, the UE may send the downlink quality information to an RNC of the base station of the primary cell, and the RNC forwards the downlink quality information to the base station of the primary cell.

By using the foregoing Method 1 and Method 2, the base station of the primary cell acquires the downlink quality information of the UE.

Further, after step 201, the method further includes step 202 and step 203, which are specifically as follows:

202. The base station of the primary cell determines power control information according to the downlink quality information.

It should be noted that the base station of the primary cell may determine, according to the downlink quality information reported by the UE, the level of the interference caused by the UE to the neighboring cell. In step 202 of this embodiment, the base station of the primary cell may determine the power control information according to the level of the interference caused by the UE to the neighboring cell. Because the power control information is determined by the base station of the primary cell based on the level of the interference caused by the UE to the neighboring cell, when the UE sends uplink data by using the uplink channel transmit power, no interference is caused to the neighboring cell, or it may be ensured that when the UE sends uplink data to the base station of the primary cell by using the determined uplink channel transmit power, interference caused to the neighboring cell is within a preset acceptable range.

Specifically, step 202 may be implemented by using the following two methods:

Method 1:

The base station of the primary cell determines an absolute power value of the uplink channel transmit power of the UE according to the downlink quality information, and determines the absolute power value as the power control information.

By using such a method, after the base station of the primary cell sends the power control information to the UE, the UE may directly acquire the uplink channel transmit power from the power control information, and does not need to perform excessive calculation on the power control information, and therefore, a load on a UE side is relatively low so as to facilitate implementation on the UE side.

Method 2:

The base station of the primary cell determines a relative power value of the uplink channel transmit power of the UE according to the downlink quality information, and determines the relative power value as the power control information, where the relative power value is a ratio of the uplink channel transmit power of the UE to a control channel transmit power of the UE.

It should be emphasized that in a mobile communications system specified by the 3GPP, such as the UMTS, a UE may acquire control channel transmit power in real time. Because the relative power value is a ratio and may be represented by using fewer bits, by using Method 2, the base station of the primary cell occupies fewer air interface resources when sending the power control information to the UE, which can improve air interface resource utilization.

By using the foregoing two methods, the base station of the primary cell may implement step 202.

203. The base station of the primary cell sends the power control information to the UE, so that the UE determines an uplink channel transmit power according to the power control information.

In an optional specific implementation manner, when performing step 203, the base station of the primary cell may send the power control information to the UE in a same coding and decoding manner as an E-AGCH. By using such a method, the base station of the primary cell may send the power control information to the UE based on a standardized coding and decoding manner, so as to facilitate implementation on a base station side.

It should be noted that, by means of step 203, the base station of the primary cell sends the power control information to the UE, so that the UE may determine the uplink channel transmit power according to the power control information and perform E-TFC selection according to the uplink channel transmit power. For a specific implementation manner in which the UE performs E-TFC selection, refer to related descriptions in Embodiment 1, and details are not further described herein.

Optionally, if the base station of the primary cell does not notify the UE of the power control information at a TTI, this embodiment further includes: setting, by the primary cell, instruction signaling at an upper layer, and sending the instruction signaling to the UE, where the instruction signaling is used to instruct the UE to determine, when the power control information is not acquired at the current transmission time interval TTI, the uplink channel transmit power according to power control information that is previously acquired.

By performing the foregoing steps 202-203, after acquiring downlink quality information of a UE, a base station of a primary cell may determine, according to the downlink quality information, a level of interference caused by the UE to a cell, determine power control information of the UE based on a level of interference caused by the UE to a neighboring cell, and send the power control information to the UE, so that when the UE transmits uplink data to the base station of the primary cell according to the power control information, no interference is caused to the neighboring cell, or the level of the interference caused by the UE to the neighboring cell is within an acceptable range, so that communication quality of the neighboring cell can be ensured.

Embodiment 3

Figure 3:
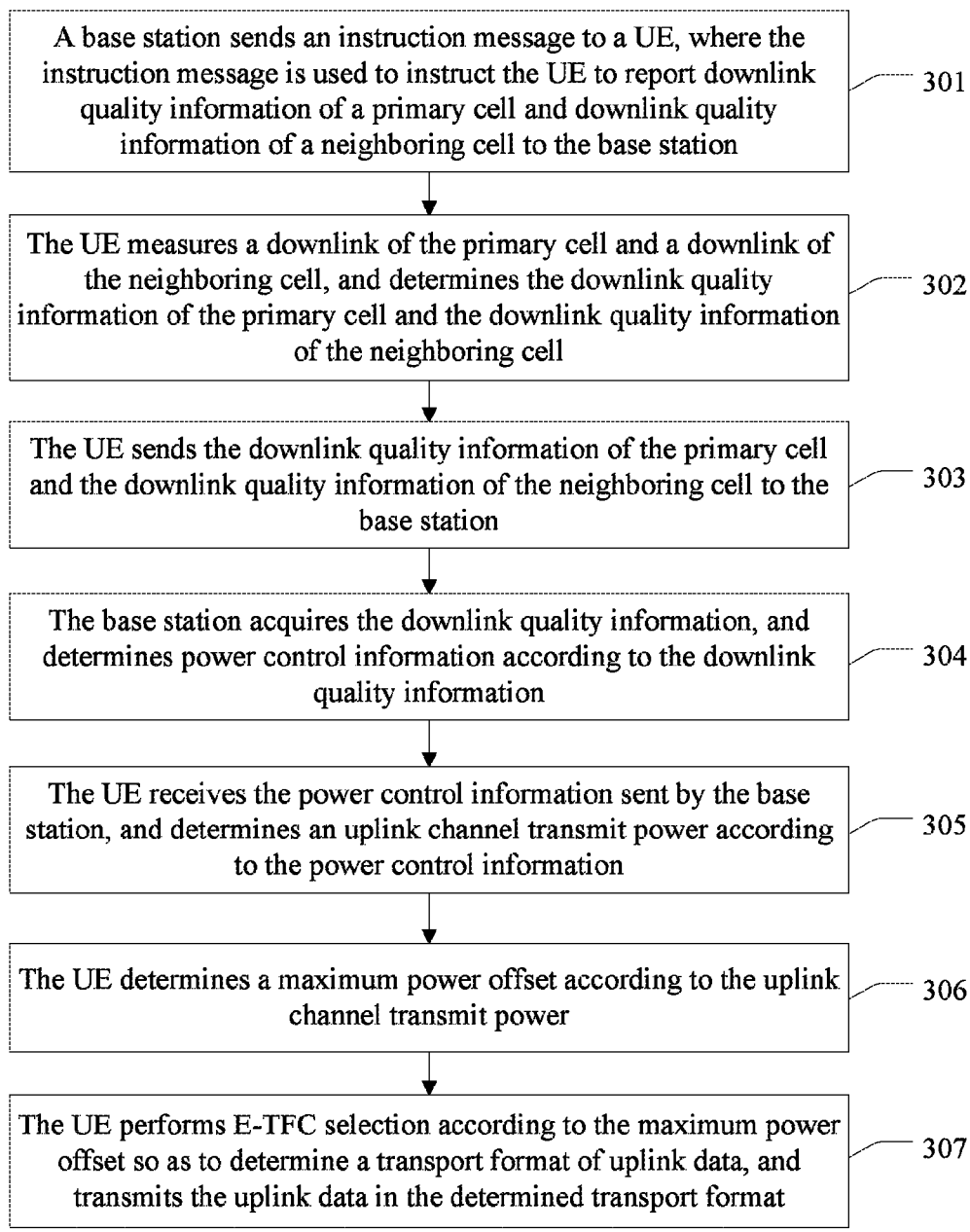
FIG. 3 is a schematic flowchart of a method for acquiring downlink quality information according to Embodiment 3 of the present invention.

With reference to Embodiment 1 and Embodiment 2, this embodiment of the present invention provides a method for acquiring downlink quality information, and as shown in FIG. 3, the method includes:

301. A base station sends an instruction message to a UE, where the instruction message is used to instruct the UE to report downlink quality information of a primary cell and downlink quality information of a neighboring cell to the base station.

It should be noted that the primary cell is a serving cell of the UE, the neighboring cell is a non-serving cell of the UE, and the neighboring cell and the primary cell are adjacent to each other. The neighboring cell and the primary cell may be neighboring cells that belong to a same base station, or may be neighboring cells that belong to different base stations, which is not limited herein. Generally, the UE has at least one neighboring cell. The base station in this embodiment is a serving base station of the UE, that is, a base station that manages the primary cell, and may be denoted as a base station of the primary cell.

302. The UE receives the instruction message sent by the base station, measures a downlink of the primary cell and a downlink of the neighboring cell according to the instruction message, and determines the downlink quality information of the primary cell and the downlink quality information of the neighboring cell.

According to one aspect, the downlink quality information may include downlink Pathloss information, and in step 302, the measuring a downlink of the primary cell and a downlink of the neighboring cell according to the instruction message includes the following specific implementation manners:

measuring, by the UE, downlink Pathloss information of the primary cell, and/or measuring, by the UE, downlink Pathloss information of the neighboring cell; or measuring, by the UE, information about a Pathloss difference between the downlink of the primary cell and the downlink of the neighboring cell.

Specifically, after measuring the downlink Pathloss information of the primary cell and the downlink Pathloss information of the neighboring cell, the UE may directly determine a Pathloss value obtained by means of measurement as Pathloss information, or may determine a downlink Pathloss level according to a Pathloss value obtained by means of measurement, and determine the Pathloss level as Pathloss information (signaling overheads can be reduced by representing the Pathloss information by using a Pathloss level). In step 302, the determining the downlink quality information of the primary cell and the downlink quality information of the neighboring cell includes the following specific implementation manners:

acquiring, by the UE, a downlink Pathloss value of the primary cell, or acquiring a downlink Pathloss level of the primary cell;

acquiring, by the UE, a downlink Pathloss value of the neighboring cell, or acquiring a downlink Pathloss level of the neighboring cell; or acquiring, by the UE, the Pathloss difference between the downlink of the primary cell and the downlink of the neighboring cell, or acquiring a level of the Pathloss difference between the downlink of the primary cell and the downlink of the neighboring cell.

According to another aspect, the downlink quality information may include RSCP information of the primary cell and/or the neighboring cell, and in step 302, the measuring a downlink of the primary cell and a downlink of the neighboring cell according to the instruction message includes the following specific implementation manners:

measuring, by the UE, RSCP information of the primary cell, and/or measuring, by the UE, RSCP information of the neighboring cell; or measuring, by the UE, information about an RSCP difference between the primary cell and the neighboring cell.

Specifically, after measuring an RSCP of the primary cell and an RSCP of the neighboring cell, the UE may directly determine RSCP values obtained by means of measurement as RSCP information, or may determine an RSCP level of the primary cell and an RSCP level of the neighboring cell according to RSCP values obtained by means of measurement (signaling overheads can be reduced by representing the RSCP information by using an RSCP level), and determine the RSCP levels as the RSCP information of the primary cell and the RSCP information the neighboring cell. In step 302, the determining the downlink quality information of the primary cell and the downlink quality information of the neighboring cell includes the following specific implementation manners:

acquiring an RSCP value of the primary cell, or acquiring an RSCP level of the neighboring cell;

acquiring an RSCP value of the neighboring cell, or acquiring an RSCP level of the neighboring cell; or acquiring the RSCP difference between the primary cell and the neighboring cell, or acquiring a level of the RSCP difference between the primary cell and the neighboring cell.

303. The UE sends the downlink quality information of the primary cell and the downlink quality information of the neighboring cell to the base station.

According to detailed descriptions in step 302, in step 303, the downlink quality information that is of the primary cell and sent by the UE to the base station and the downlink quality information that is of the neighboring cell and sent by the UE to the base station may be any type of the following multiple types of information: ① the downlink Pathloss value of the primary cell and/or the downlink Pathloss value of the neighboring cell; ② the downlink Pathloss level of the primary cell and/or the downlink Pathloss information of the neighboring cell; ③ the Pathloss difference between the downlink of the primary cell and the downlink of the neighboring cell or the level of the Pathloss difference between the downlink of the primary cell and the downlink of the neighboring cell; ④ the RSCP value of the primary cell and/or the RSCP value of the neighboring cell; ⑤ the RSCP level of the primary cell and/or the RSCP level of the neighboring cell; and ⑥ the RSCP difference between the primary cell and the neigh-boring cell or the level of the RSCP difference between the primary cell and the neighboring cell.

Specifically, the UE may directly send the downlink quality information to the base station, or the UE may send the determined downlink quality information to an RNC, and the RNC forwards the downlink quality information to the base station.

When the UE directly sends the downlink quality information to the base station, the following method may be used:

the UE may add the downlink quality information into a MAC-i PDU, and send, to the base station, the MAC-I PDU that carries the downlink quality information; or the UE may add the downlink quality information into an SI packet, and send, to the base station, the SI packet that carries the downlink quality information.

Generally, an SI packet is 18 bits, and a specific format of the SI packet is shown in the following Table 1:

TABLE 1

| UPH (5 bits) | TEBS (5 bits) | HLBS (4 bits) | HLID (4 bits) |
| --- | --- | --- | --- | where UPH (UE transmission power headroom) is used to indicate power headroom of the UE, TEBS (total E-DCH buffer status) is used to indicate a total E-DCH buffer status, HLBS highest priority logical channel buffer status) is used to indicate a highest priority logical channel buffer status, and HLID (highest priority logical channel ID) is used to indicate a highest priority logical channel ID.

Specifically, the UE may determine a specified bit in the SI packet according to a protocol specification, add the downlink quality information into the specified bit of the SI packet, and send the SI packet to the base station. For example, the UE may add the downlink quality information into a UPH field of the SI packet and send the SI packet to the base station.

304. The base station acquires the downlink quality information, and determines power control information according to the downlink quality information.

The base station may learn about, according to the downlink quality information, a level of interference caused by the UE to the primary cell and a level of interference caused by the UE to the neighboring cell. The base station may determine the power control information of the UE based on the level of the interference caused by the UE to the primary cell and the level of the interference caused by the UE to the neighboring cell, so as to ensure that when the UE sends uplink data according to the power control information, no interference is caused to the primary cell and the neighboring cell, or ensure that when the UE sends uplink data according to the power control information, the level of the interference to the primary cell and the level of the interference to the neighboring cell are within an acceptable range.

Specifically, the base station may determine the power control information of the UE by using the following method: the base station may determine an absolute power value of an uplink channel transmit power of the UE according to the downlink quality information, and determine the absolute power value as the power control information; or the base station may determine a relative power value of an uplink channel transmit power of the UE according to the downlink quality information, and determine the relative power value as the power control information, where the relative power value is a ratio of the uplink channel transmit power of the UE to a control channel transmit power of the UE.

Preferably, to reduce signaling overheads, the downlink quality information received by the base station may be a Pathloss level or an RSCP level, and each Pathloss level or RSCP level indicates a Pathloss value or an RSCP value that is within a range. For example, the Pathloss information or the RSCP information that is reported by the UE may have three levels: a level 0, a level 1, and a level 2. By using such a method, the UE can implement sending of the downlink quality information (which may be the Pathloss information or the RSCP information) by using only two bits. If the base station determines that the downlink quality information reported by the UE is of the level 0, the base station controls the power control information of the UE at 20 dB ROT by means of scheduling; if the base station determines that the downlink quality information reported by the UE is of the level 1, the base station controls the power control information of the UE at 15 dB ROT by means of scheduling; if the base station determines that the downlink quality information reported by the UE is of the level 2, the base station controls the power control information of the UE at 6 dB ROT by means of scheduling. In this example, when a level of the downlink quality information reported by the UE is 0, it indicates best quality of this downlink and a minimum level of interference to the neighboring cell. The base station allows the UE to use a relatively large uplink channel transmit power, and in addition, the base station may receive, by using a relatively large power, uplink data or signaling that is sent by the UE.

Preferably, the base station may send the power control information to the UE in a same coding and decoding manner as an E-AGCH channel, and make full use of channel design of the E-AGCH channel, so as to facilitate parsing of the power control information by the UE, and reduce complexity of the UE.

305. The UE receives the power control information sent by the base station, and determines an uplink channel transmit power according to the power control information.

Specifically, step 305 may be implemented by using at least the following two methods:

Method 1:

S1. The UE receives the power control information sent by the base station, where the power control information is an absolute power value that is of a current uplink channel transmit power of the user equipment UE and that is determined by the base station.

S2. The UE determines the absolute power value as the uplink channel transmit power.

Method 2:

S1. The UE receives the power control information sent by the base station, where the power control information is a relative power value that is of a current uplink channel transmit power of the UE and that is determined by the base station, and the relative power value is a ratio of the uplink channel transmit power of the UE to a control channel transmit power of the UE.

S2. The UE determines the uplink channel transmit power according to the relative power value and the control channel transmit power of the UE.

The base station notifies the UE of the control channel transmit power of the UE in real time by using the E-DP-CCH.

306. The UE determines a maximum power offset according to the uplink channel transmit power, where the maximum power offset is a maximum ratio of the current uplink channel transmit power of the UE to a control channel transmit power.

307. The UE performs E-TFC (E-DCH transport format combination) selection according to the maximum power offset so as to determine a transport format of uplink data, and transmits the uplink data in the determined transport format.

Specifically, the UE may perform E-TFC selection by using the following formula:

$$\left\lfloor K_{e,ref,m} \cdot \frac{A_{ed,a}^2}{L_{e,ref,m} \cdot A_{ed,m}^2 \cdot 10^{\Delta harq/10}} \right\rfloor,$$

where $A_{ed,a}$ is the maximum power offset determined by the UE, $K_{e,ref,m}$ is a TBS of the $m^{th}$ piece of reference E-TFC, $L_{e,ref,m}$ is a quantity of E-DPDCHs of the $m^{th}$ piece of reference E-TFC, $A_{ed,m}$ is a quantized amplitude ratio of the $m^{th}$ piece of reference E-TFC, and harq is an HARQ offset.

Specifically, the UE calculates, based on the foregoing formula, a maximum bit used by the UE to send an E-TFC, and in an uplink transmission process, a quantity of bits used by the UE to send an E-TFC does not exceed the maximum bit obtained by means of calculation.

It should be noted that, in this embodiment, the base station may set instruction signaling at an upper layer (which refers to a layer outside a physical layer, such as an RRC layer). If the base station does not send the power control information to the UE at a TTI, the UE may determine the uplink channel transmit power at the TTI according to power control information that is previously acquired.

According to the method for determining an uplink channel transmit power that is provided in this embodiment, a UE sends downlink quality information to a base station, so that the base station learns about, according to the downlink quality information, a level of interference caused by the UE to a neighboring cell, and determines power control information of the UE based on the level of the interference caused by the UE to the neighboring cell, so that when the UE transmits uplink data to the base station according to the power control information, no interference is caused to the neighboring cell, or the level of the interference caused by the UE to the neighboring cell is within an acceptable range, so that communication quality of the neighboring cell can be ensured.

It should be emphasized that when a UE is located in a soft handover area (the soft handover area refers to an intersected area of areas covered by two NodeBs, and the two NodeBs are a serving NodeB and a non-serving NodeB of the UE), the non-serving NodeB may send control signaling to the UE by using an E-RGCH (E-DCH relative grant channel), so as to reduce a transmit power of the UE, thereby controlling interference caused by the UE to the non-serving NodeB.

In 3GPP Release 12, a scenario of an uplink dedicated secondary carrier is discussed, and the dedicated secondary carrier is also referred to as a lean carrier. This carrier supports uplink scheduling of time division multiplexing, and a grant given by a NodeB is greater than that on a conventional carrier, and therefore, use of a larger uplink channel transmit power by the UE is supported, which means that strong interference is caused to a neighboring cell. In addition, a soft handover may even not be supported on the lean carrier, that is, an E-RGCH channel of a non-serving cell is not accepted, and control of inter-cell interference further deteriorates. Therefore, in 3GPP Release 12, the non-serving NodeB cannot control an uplink transmit power of the UE by using the E-RGCH. In the method for determining an uplink channel transmit power that is provided in this embodiment, the serving NodeB performs power control on the UE, and therefore, the method provided in this embodiment can be applicable to the uplink dedicated secondary carrier or the lean carrier in 3GPP Release 12 to perform interference control.

Embodiment 4

This embodiment provides an apparatus for acquiring downlink quality information, which can implement methods executed by a UE in Embodiment 1, Embodiment 2, and Embodiment 3 of the present invention.

Figure 4:
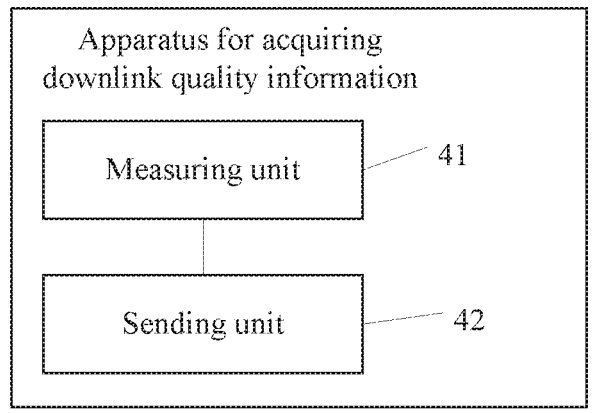
FIG. 4 and FIG. 5 are structural diagrams of an apparatus for acquiring downlink quality information according to Embodiment 4 of the present invention.

As shown in FIG. 4, the apparatus for acquiring downlink quality information provided in this embodiment includes:

a measuring unit 41, configured to measure the downlink quality information; and a sending unit 42, configured to report the downlink quality information measured by the measuring unit 41 to a network-side device.

Specifically, the measuring unit 41 is configured to measure a downlink of a primary cell and a downlink of a neighboring cell, and acquire at least one type of downlink quality information of the primary cell and downlink quality information of the neighboring cell.

According to one aspect, the measuring unit 41 is configured to: measure downlink transmission pathloss Pathloss information of the primary cell, and/or measure downlink Pathloss information of the neighboring cell;
or
the measuring unit 41 is configured to measure information about a Pathloss difference between the downlink of the primary cell and the downlink of the neighboring cell.

Specifically, the measuring unit 41 is configured to: acquire a downlink Pathloss value of the primary cell, or acquire a downlink Pathloss level of the primary cell;

the measuring unit 41 is further configured to: acquire a downlink Pathloss value of the neighboring cell, or acquire a downlink Pathloss level of the neighboring cell; or the measuring unit 41 is further configured to: acquire the Pathloss difference between the downlink of the primary cell and the downlink of the neighboring cell, or acquire a level of the Pathloss difference between the downlink of the primary cell and the downlink of the neighboring cell.

According to another aspect, the measuring unit 41 is specifically configured to: measure received signal code power RSCP information of the primary cell, and/or measure RSCP information of the neighboring cell; or the measuring unit 41 is further configured to measure information about an RSCP difference between the primary cell and the neighboring cell.

Specifically, the measuring unit 41 is configured to: acquire an RSCP value of the primary cell, or acquire an RSCP level of the neighboring cell;

the measuring unit 41 is further configured to: acquire an RSCP value of the neighboring cell, or acquire an RSCP level of the neighboring cell; or the measuring unit 41 is further configured to: acquire the RSCP difference between the primary cell and the neighboring cell, or acquire a level of the RSCP difference between the primary cell and the neighboring cell.

Specifically, the sending unit 42 is configured to send the downlink quality information to a base station; or the sending unit 42 is further configured to send the downlink quality information to a radio network controller RNC, so that the RNC forwards the downlink quality information to a base station.

In a specific implementation manner, the sending unit 42 is specifically configured to: when sending the downlink quality information to the base station, add the downlink quality information into an enhanced uplink protocol data unit MAC-I PDU and send the MAC-I PDU to the base station, or add the downlink quality information into a scheduling information SI packet and send the SI packet to the base station.

In a further specific implementation manner, the sending unit 42 is specifically configured to: when adding the downlink quality information into the SI packet and sending the SI packet to the base station, add the downlink quality information into a specified bit of the SI packet, and send, to the base station, the SI packet that carries the downlink quality information; or the sending unit 42 is further configured to: add the downlink quality information into a user equipment transmission power headroom UPH field of the SI packet, and send, to the base station, the SI packet that carries the downlink quality information.

Figure 5:
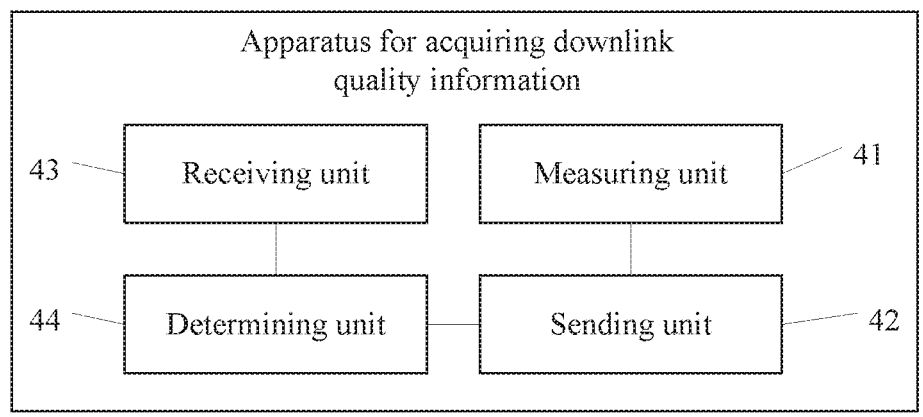

Further, as shown in FIG. 5, the apparatus further includes:

a receiving unit 43, configured to receive power control information that is sent by the base station according to the downlink quality information; and a determining unit 44, configured to determine an uplink channel transmit power according to the power control information received by the receiving unit 43.

Preferably, the power control information received by the receiving unit 43 is an absolute power value that is of a current uplink channel transmit power of user equipment UE and that is determined by the base station; and the determining unit 44 is configured to determine the absolute power value received by the receiving unit 43 as the uplink channel transmit power.

Optionally, the power control information received by the receiving unit 43 is a relative power value that is of a current uplink channel transmit power of a UE and that is determined by the base station, and the relative power value is a ratio of the uplink channel transmit power of the UE to a control channel transmit power of the UE; and the determining unit 44 is configured to determine the uplink channel transmit power according to the relative power value received by the receiving unit 43 and the control channel transmit power of the UE.

In a specific implementation manner, the receiving unit 43 is specifically configured to receive, in a same coding and decoding manner as an enhanced dedicated channel absolute grant channel E-AGCH channel, the power control information sent by the base station.

Further, the sending unit 42 is further configured to send uplink data to the base station by using the uplink channel transmit power determined by the determining unit 44, where the sending unit 42 is specifically configured to: determine a maximum power offset according to the uplink channel transmit power determined by the determining unit 44; perform enhanced dedicated channel transport format combination E-TFC selection according to the maximum power offset so as to determine a transport format of the uplink data; and transmit the uplink data in the determined transport format, where the maximum power offset is a maximum ratio of the current uplink channel transmit power of the UE to the control channel transmit power.

Specifically, the sending unit 42 is configured to perform E-TFC selection according to the maximum power offset and by using the following formula:

$$\left\lfloor K_{e,ref,m} \cdot \frac{A_{ed,a}^2}{L_{e,ref,m} \cdot A_{ed,m}^2 \cdot 10^{\Delta harq/10}} \right\rfloor,$$

where $A_{ed,a}$ is the maximum power offset determined by the UE, $K_{e,ref,m}$ is a transport block set TBS of the $m^{th}$ piece of reference E-TFC, $L_{e,ref,m}$ is a quantity of enhanced dedicated physical data channels E-DPDCHs of the $m^{th}$ piece of reference E-TFC, $A_{ed,m}$ is a quantized amplitude ratio of the $m^{th}$ piece of reference E-TFC, and harq is a hybrid automatic repeat request HARQ offset.

Optionally, the receiving unit 43 is further configured to receive instruction signaling that is sent by the base station at an upper layer, where the instruction signaling is used to instruct the UE to determine, when the power control information is not acquired currently at a current transmission time interval TTI, the uplink channel transmit power according to power control information that is previously acquired.

According to the apparatus (UE) for acquiring downlink quality information that is provided in this embodiment, the downlink quality information is sent to a base station, so that the base station learns about, according to the downlink quality information, a level of interference caused by the UE to a neighboring cell, and determines power control information of the UE based on the level of the interference caused by the UE to the neighboring cell, so that when the UE transmits uplink data to the base station according to the power control information, no interference is caused to the neighboring cell, or the level of the interference caused by the UE to the neighboring cell is within an acceptable range, so that communication quality of the neighboring cell can be ensured.

Embodiment 5

This embodiment of the present invention provides an apparatus for acquiring downlink quality information, which can implement methods implemented by a base station of a primary cell in Embodiment 1, Embodiment 2, and Embodiment 3.

Figure 6:
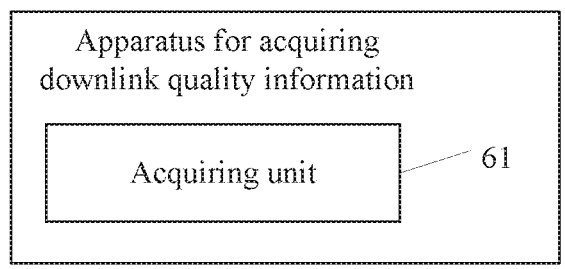
FIG. 6 and FIG. 7 are structural diagrams of an apparatus for acquiring downlink quality information according to Embodiment 5 of the present invention.

As shown in FIG. 6, the apparatus provided in this embodiment includes:

an acquiring unit 61, configured to acquire downlink quality information sent by user equipment UE, where the downlink quality information includes at least one type of downlink quality information of a primary cell and downlink quality information of a neighboring cell.

According to one aspect, the acquiring unit 61 is specifically configured to: acquire downlink transmission pathloss Pathloss information of the primary cell, and/or acquire downlink Pathloss information of the neighboring cell; or the acquiring unit 61 is specifically configured to acquire information about a Pathloss difference between downlink Pathloss information of the primary cell and downlink Pathloss information of the neighboring cell.

Specifically, the acquiring unit 61 is configured to: when acquiring the downlink Pathloss information of the primary cell, acquire a downlink Pathloss value of the primary cell, or acquire a downlink Pathloss level of the primary cell;

the acquiring unit 61 is further configured to: when acquiring the downlink Pathloss information of the neighboring cell, acquire a downlink Pathloss value of the neighboring cell, or acquire a downlink Pathloss level of the neighboring cell; or the acquiring unit 61 is further configured to: when acquiring the information about the Pathloss difference between the downlink Pathloss information of the primary cell and the downlink Pathloss information of the neighboring cell, acquire the Pathloss difference between the downlink Pathloss information of the primary cell and the downlink Pathloss information of the neighboring cell, or acquire a level of the Pathloss difference between the downlink Pathloss information of the primary cell and the downlink Pathloss information of the neighboring cell.

According to another aspect, the acquiring unit 61 is specifically configured to: acquire received signal code power RSCP information of the primary cell, and/or acquire RSCP information of the neighboring cell; or the acquiring unit 61 is specifically configured to acquire information about an RSCP difference between RSCP information of the primary cell and RSCP information of the neighboring cell.

Specifically, the acquiring unit 61 is configured to: when acquiring the received signal code power RSCP information of the primary cell, acquire an RSCP value of the primary cell, or acquire an RSCP level of the neighboring cell:

the acquiring unit 61 is further configured to: when acquiring the RSCP information of the neighboring cell, acquire an RSCP value of the neighboring cell, or acquire an RSCP level of the neighboring cell; and the acquiring unit 61 is further configured to: when acquiring the information about the RSCP difference between the RSCP information of the primary cell and the RSCP information of the neighboring cell, acquire the RSCP difference between the primary cell and the neighboring cell, or acquire a level of the RSCP difference between the primary cell and the neighboring cell.

Figure 7:
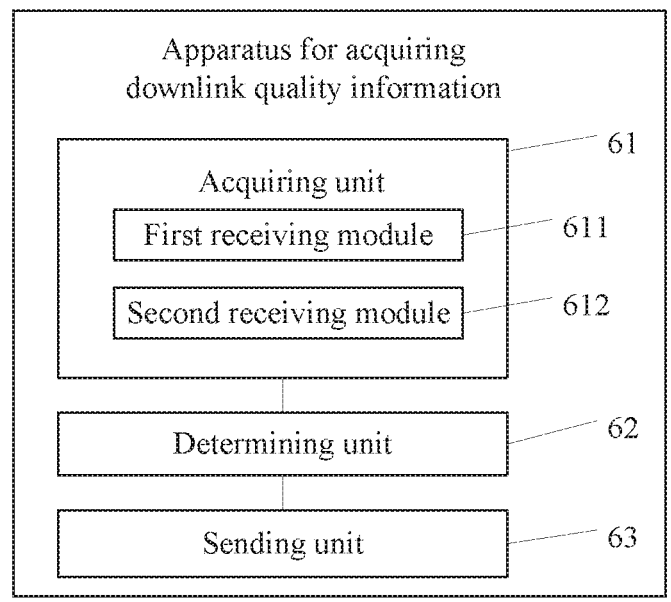

Further, as shown in FIG. 7, the acquiring unit 61 includes a first receiving module 611 or a second receiving module 612, where the first receiving module 611 is configured to receive the downlink quality information reported by the UE; or the second receiving module 612 is configured to receive downlink quality information sent by a radio network controller RNC.

Specifically, the first receiving module 611 is configured to receive an enhanced uplink protocol data unit MAC-i PDU reported by the UE, where the MAC-i PDU carries the downlink quality information; and the acquiring unit 61 is configured to acquire the downlink quality information from the MAC-i PDU received by the first receiving module 611.

The first receiving module 611 is further configured to receive a scheduling information SI packet reported by the UE, where the SI packet carries the downlink quality information; and the acquiring unit 61 is configured to acquire the downlink quality information from the SI packet received by the first receiving module 611.

Specifically, the acquiring unit 61 is specifically configured to: acquire the downlink quality information from a specified bit of the SI packet, or acquire the downlink quality information from a UPH field of the SI packet, where the specified bit of the SI packet carries the downlink quality information, or the user equipment transmission power headroom UPH field of the SI packet carries the downlink quality information.

As shown in FIG. 7, the apparatus further includes:

a determining unit 62, configured to determine power control information according to the downlink quality information acquired by the acquiring unit 61; and a sending unit 63, configured to send the power control information determined by the determining unit 62 to the UE, so that the UE determines an uplink channel transmit power according to the power control information.

The determining unit 62 is specifically configured to: determine an absolute power value of the uplink channel transmit power of the UE according to the downlink quality information acquired by the acquiring unit 61, and determine the absolute power value as the power control information; or the determining unit 62 is further specifically configured to: determine a relative power value of the uplink channel transmit power of the UE according to the downlink quality information, and determine the relative power value as the power control information, where the relative power value is a ratio of the uplink channel transmit power of the UE to a control channel transmit power of the UE.

The sending unit 63 is specifically configured to send the power control information determined by the determining unit 62 to the UE in a same coding and decoding manner as an enhanced dedicated channel absolute grant channel E-AGCH channel.

The power control information sent by the sending unit 63 is used by the UE to determine the uplink channel transmit power according to the power control information and perform E-TFC selection according to the uplink channel transmit power.

Optionally, the determining unit 62 is further configured to set instruction signaling at an upper layer.

The sending unit 63 is further configured to send the instruction signaling determined by the determining unit 62 to the UE, where the instruction signaling is used to instruct the UE to determine, when the power control information is not acquired at a current transmission time interval TTI, the uplink channel transmit power according to power control information that is previously acquired.

The apparatus for acquiring downlink quality information that is provided in this embodiment may be applied to a base station. By acquiring downlink quality information sent by a UE, the base station learns about, according to the downlink quality information, a level of interference caused by the UE to a neighboring cell, and determines power control information of the UE based on the level of the interference caused by the UE to the neighboring cell, so that when the UE transmits uplink data to the base station according to the power control information, no interference is caused to the neighboring cell, or the level of the interference caused by the UE to the neighboring cell is within an acceptable range, so that communication quality of the neighboring cell can be ensured.

Embodiment 6

An embodiment provides user equipment, which can implement methods executed by a UE in Embodiment 1, Embodiment 2, and Embodiment 3 of the present invention.

Figure 8:
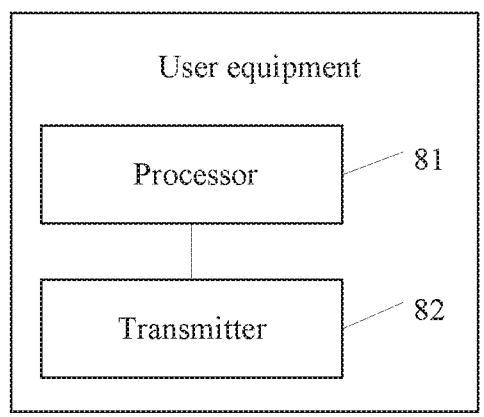
FIG. 8 and FIG. 9 are structural diagrams of user equipment according to Embodiment 6 of the present invention.

As shown in FIG. 8, the user equipment provided in this embodiment includes:

a processor 81, configured to measure downlink quality information; and a transmitter 82, configured to report the downlink quality information measured by the processor 81 to a network-side device.

Specifically, the processor 81 is specifically configured to: measure a downlink of a primary cell and a downlink of a neighboring cell, and acquire at least one type of downlink quality information of the primary cell and downlink quality information of the neighboring cell.

According to one aspect, the processor 81 is configured to: measure downlink transmission pathloss Pathloss information of the primary cell, and/or measure downlink Pathloss information of the neighboring cell;

or the processor 81 is configured to measure information about a Pathloss difference between the downlink of the primary cell and the downlink of the neighboring cell.

Specifically, the processor 81 is configured to: acquire a downlink Pathloss value of the primary cell, or acquire a downlink Pathloss level of the primary cell;

the processor 81 is further configured to: acquire a downlink Pathloss value of the neighboring cell, or acquire a downlink Pathloss level of the neighboring cell; or the processor 81 is further configured to: acquire the Pathloss difference between the downlink of the primary cell and the downlink of the neighboring cell, or acquire a level of the Pathloss difference between the downlink of the primary cell and the downlink of the neighboring cell.

According to another aspect, the processor 81 is specifically configured to: measure received signal code power RSCP information of the primary cell, and/or measure RSCP information of the neighboring cell; or the processor 81 is further configured to measure information about an RSCP difference between the primary cell and the neighboring cell.

Specifically, the processor 81 is configured to: acquire an RSCP value of the primary cell, or acquire an RSCP level of the neighboring cell;

the processor 81 is further configured to: acquire an RSCP value of the neighboring cell, or acquire an RSCP level of the neighboring cell; or the processor 81 is further configured to acquire the RSCP difference between the primary cell and the neighboring cell, or acquire a level of the RSCP difference between the primary cell and the neighboring cell.

Specifically, the transmitter 82 is configured to send the downlink quality information to a base station; or the transmitter 82 is further configured to send the downlink quality information to a radio network controller RNC, so that the RNC forwards the downlink quality information to a base station.

In a specific implementation manner, the transmitter 82 is specifically configured to: when sending the downlink quality information to the base station, add the downlink quality information into a MAC-i protocol data unit PDU and send the MAC-i PDU to the base station, or add the downlink quality information into an SI packet and send the SI packet to the base station.

In a further specific implementation manner, the transmitter 82 is specifically configured to: when adding the downlink quality information into the SI packet and sending the SI packet to the base station, add the downlink quality information into a specified bit of the SI packet, and send, to the base station, the SI packet that carries the downlink quality information; or the transmitter 82 is further configured to: add the downlink quality information into a user equipment transmission power headroom UPH field of the SI packet, and send, to the base station, the SI packet that carries the downlink quality information.

Figure 9:
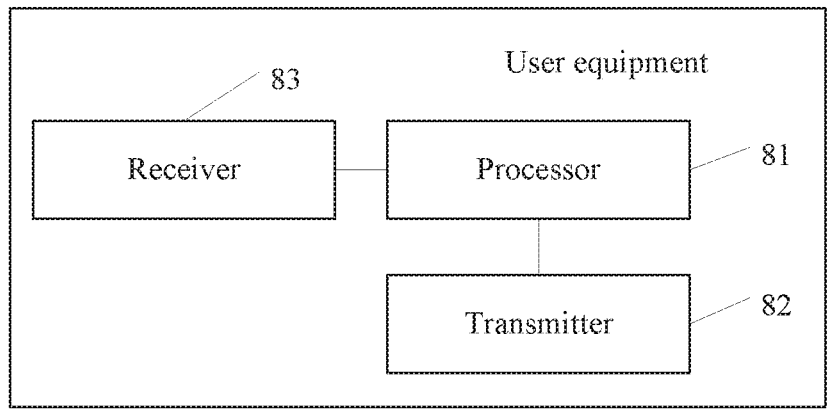

Further, as shown in FIG. 9, the user equipment further includes:

a receiver 83, configured to receive power control information that is sent by the base station according to the downlink quality information; and the processor 81 is further configured to determine an uplink channel transmit power according to the power control information received by the receiver 83.

Preferably, the power control information received by the receiver 83 is an absolute power value that is of current uplink channel transmit power of the user equipment UE and that is determined by the base station; and the processor 81 is configured to determine the absolute power value received by the receiver 83 as the uplink channel transmit power.

Optionally, the power control information received by the receiver 83 is a relative power value that is of a current uplink channel transmit power of the UE and that is determined by the base station, and the relative power value is a ratio of the uplink channel transmit power of the UE to a control channel transmit power of the UE; and the processor 81 is configured to determine the uplink channel transmit power according to the relative power value received by the receiver 83 and the control channel transmit power of the UE.

In a specific implementation manner, the receiver 83 is specifically configured to receive, in a same coding and decoding manner as an enhanced dedicated channel absolute grant channel E-AGCH channel, the power control information sent by the base station.

Further, the transmitter 82 is further configured to send uplink data to the base station by using the uplink channel transmit power determined by the processor 81, where the transmitter 82 is specifically configured to: determine a maximum power offset according to the uplink channel transmit power determined by the processor 81; perform enhanced dedicated channel transport format combination E-TFC selection according to the maximum power offset so as to determine a transport format of the uplink data; and transmit the uplink data in the determined transport format, where the maximum power offset is a maximum ratio of the current uplink channel transmit power of the UE to the control channel transmit power.

Specifically, the transmitter 82 is specifically configured to perform E-TFC selection according to the maximum power offset and by using the following formula:

$$\left[ K_{e,ref,m} \cdot \frac{A_{ed,a}^2}{L_{e,ref,m} \cdot A_{ed,m}^2 \cdot 10^{\Delta harq/10}} \right],$$

where $A_{ed,a}$ is the maximum power offset determined by the UE, $K_{e,ref,m}$ is a transport block set TBS of the $m^{th}$ piece of reference E-TFC, $L_{e,ref,m}$ is a quantity of enhanced dedicated physical data channels E-DPDCHs of the $m^{th}$ piece of reference E-TFC, $A_{ed,m}$ is a quantized amplitude ratio of the $m^{th}$ piece of reference E-TFC, and harq is a hybrid automatic repeat request HARQ offset.

Optionally, the receiver 83 is further configured to receive instruction signaling that is sent by the base station at an upper layer, where the instruction signaling is used to instruct the UE to determine, when the power control information is not acquired currently at a current transmission time interval TTI, the uplink channel transmit power according to power control information that is previously acquired.

According to the user equipment UE provided in this embodiment, downlink quality information is sent to a base station, so that the base station learns about, according to the downlink quality information, a level of interference caused by the UE to a neighboring cell, and determines power control information of the UE based on the level of the interference caused by the UE to the neighboring cell, so that when the UE transmits uplink data to the base station according to the power control information, no interference is caused to the neighboring cell, or the level of the interference caused by the UE to the neighboring cell is within an acceptable range, so that communication quality of the neighboring cell can be ensured.

Embodiment 7

This embodiment of the present invention provides a base station, which can implement methods implemented by a base station primary cell in Embodiment 1, Embodiment 2, and Embodiment 3.

Figure 10:
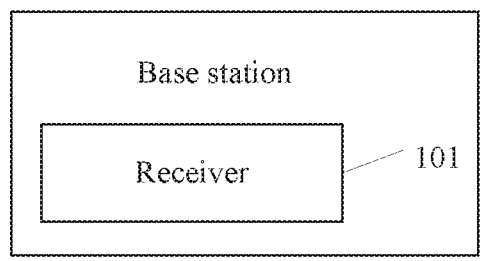
FIG. 10 and FIG. 11 are structural diagrams of a base station according to Embodiment 7 of the present invention.

As shown in FIG. 10, the base station provided in this embodiment includes:

a receiver 101, configured to acquire downlink quality information sent by user equipment UE, where the downlink quality information includes at least one type of downlink quality information of a primary cell and downlink quality information of a neighboring cell.

According to one aspect, the receiver 101 is specifically configured to: acquire downlink transmission pathloss Pathloss information of the primary cell, and/or acquire downlink Pathloss information of the neighboring cell; or the receiver 101 is specifically configured to acquire information about a Pathloss difference between downlink Pathloss information of the primary cell and downlink Pathloss information of the neighboring cell.

Specifically, the receiver 101 is configured to: when acquiring the downlink Pathloss information of the primary cell, acquire a downlink Pathloss value of the primary cell, or acquire a downlink Pathloss level of the primary cell;

the receiver 101 is further configured to: when acquiring the downlink Pathloss information of the neighboring cell, acquire a downlink Pathloss value of the neighboring cell, or acquire a downlink Pathloss level of the neighboring cell; or the receiver 101 is further configured to: when acquiring the information about the Pathloss difference between the downlink Pathloss information of the primary cell and the downlink Pathloss information of the neighboring cell, acquire the Pathloss difference between the downlink Pathloss information of the primary cell and the downlink Pathloss information of the neighboring cell, or acquire a level of the Pathloss difference between the downlink Pathloss information of the primary cell and the downlink Pathloss information of the neighboring cell.

According to another aspect, the receiver 101 is specifically configured to: acquire received signal code power RSCP information of the primary cell, and/or acquire RSCP information of the neighboring cell; or the receiver 101 is specifically configured to acquire information about an RSCP difference between RSCP information of the primary cell and RSCP information of the neighboring cell.

Specifically, the receiver 101 is configured to: when acquiring the received signal code power RSCP information of the primary cell, acquire an RSCP value of the primary cell, or acquire an RSCP level of the neighboring cell:

the receiver 101 is further configured to: when acquiring the RSCP information of the neighboring cell, acquire an RSCP value of the neighboring cell, or acquire an RSCP level of the neighboring cell; or the receiver 101 is further configured to: when acquiring the information about the RSCP difference between the RSCP information of the primary cell and the RSCP information of the neighboring cell, acquire the RSCP difference between the primary cell and the neighboring cell, or acquire a level of the RSCP difference between the primary cell and the neighboring cell.

Specifically, the receiver 101 is configured to receive the downlink quality information reported by the UE; or the receiver 101 is configured to receive downlink quality information sent by a radio network controller RNC.

Specifically, the receiver 101 is specifically configured to: when receiving the downlink quality information reported by the UE, receive an enhanced uplink protocol data unit MAC-i PDU reported by the UE, and acquire the downlink quality information from the MAC-i PDU, where the MAC-i PDU carries the downlink quality information.

Specifically, the receiver 101 is further configured to: receive a scheduling information SI packet reported by the UE, and acquire the downlink quality information from the SI packet, where the SI packet carries the downlink quality information.

Specifically, the receiver 101 is configured to: acquire the downlink quality information from a specified bit of the SI packet, or acquire the downlink quality information from a UPH field of the SI packet, where the specified bit of the SI packet carries the downlink quality information, or the user equipment transmission power headroom UPH field of the SI packet carries the downlink quality information.

Figure 11:
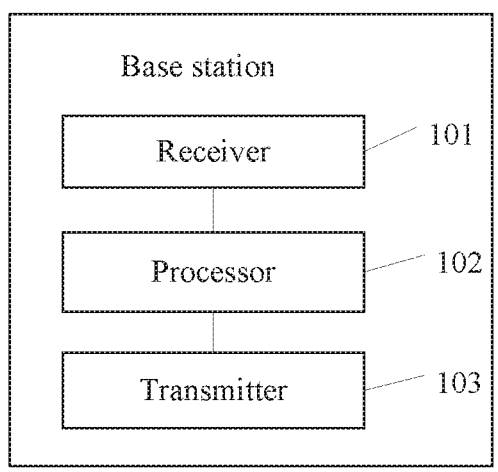

Further, as shown in FIG. 11, the base station further includes:

a processor 102, further configured to determine power control information according to the downlink quality information acquired by the receiver 101; and a transmitter 103, configured to send the power control information determined by the processor 102 to the UE, so that the UE determines an uplink channel transmit power according to the power control information.

The processor 102 is specifically configured to: determine an absolute power value of the uplink channel transmit power of the UE according to the downlink quality information acquired by the receiver 101, and determine the absolute power value as the power control information; or the processor 102 is further specifically configured to: determine a relative power value of the uplink channel transmit power of the UE according to the downlink quality information, and determine the relative power value as the power control information, where the relative power value is a ratio of the uplink channel transmit power of the UE to a control channel transmit power of the UE.

In a specific implementation manner, the transmitter 103 is configured to send the power control information determined by the processor 102 to the UE in a same coding and decoding manner as an enhanced dedicated channel absolute grant channel E-AGCH channel.

Further, the power control information sent by the transmitter 103 is used by the UE to determine the uplink channel transmit power according to the power control information and perform E-TFC selection according to the uplink channel transmit power.

Optionally, the processor 102 is further configured to set instruction signaling at an upper layer; and the transmitter 103 is further configured to send the instruction signaling set by the processor 102 to the UE, where the instruction signaling is used to instruct the UE to determine, when the power control information is not acquired at a current transmission time interval TTI, the uplink channel transmit power according to power control information that is previously acquired.

According to the base station for acquiring downlink quality information that is provided in this embodiment, by acquiring downlink quality information sent by a UE, the base station learns about, according to the downlink quality information, a level of interference caused by the UE to a neighboring cell, and determines power control information of the UE based on the level of the interference caused by the UE to the neighboring cell, so that when the UE transmits uplink data to the base station according to the power control information, no interference is caused to the neighboring cell, or the level of the interference caused by the UE to the neighboring cell is within an acceptable range, so that communication quality of the neighboring cell can be ensured.

An embodiment of the present invention further provides a system for acquiring downlink quality information, which includes the apparatuses for acquiring downlink quality information that is described in the foregoing Embodiment 4 and Embodiment 5.

An embodiment of the present invention further provides a system for acquiring downlink quality information, which includes the user equipment described in the foregoing Embodiment 6 and the base station described in Embodiment 7.

An embodiment of the present invention further provides a system for acquiring downlink quality information, which includes the user equipment, the base station, and the RNC in the foregoing Embodiment 3.

Based on the foregoing descriptions of the implementation manners, a person skilled in the art may clearly understand that the present invention may be implemented by software in addition to necessary universal hardware or by hardware only. In most circumstances, the former is a preferred implementation manner. Based on such an understanding, the technical solutions of the present invention essentially or the part contributing to the prior art may be implemented in a form of a software product. The computer software product is stored in a readable storage medium, such as a floppy disk, a hard disk or an optical disc of a computer, and includes several instructions for instructing a computer device (which may be a personal computer, a server, or a network device) to perform the methods described in the embodiments of the present invention.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for acquiring downlink quality information, comprising:
measuring the downlink quality information;
reporting the downlink quality information to a network-side device;
wherein the measuring the downlink quality information specifically comprises:
measuring a downlink quality of a primary cell and a downlink quality of a neighboring cell, and acquiring at least one type of downlink quality information of the primary cell and downlink quality information of the neighboring cell;
wherein the reporting the downlink quality information to the network-side device comprises:
sending the downlink quality information to a base station; or
sending the downlink quality information to a radio network controller (RNC), so that the RNC forwards the downlink quality information to a base station;
receiving power control information that is sent by the base station according to the downlink quality information;
determining an uplink channel transmit power according to the power control information; and
determine, when the power control information is not acquired at a current transmission time interval (TTI), the uplink channel transmit power according to power control information that is previously acquired.

2. The method according to claim 1, wherein the measuring a downlink of a primary cell and a downlink of a neighboring cell comprises:
measuring at least one of downlink transmission pathloss information of the primary cell and downlink pathloss information of the neighboring cell; or
measuring information about a pathloss difference between the downlink of the primary cell and the downlink of the neighboring cell.

3. The method according to claim 1, wherein when the downlink quality information is sent to the base station, the sending the downlink quality information to a base station comprises:
adding the downlink quality information into an enhanced uplink protocol data unit (MAC-i PDU), and sending the MAC-i PDU to the base station; or
adding the downlink quality information into a scheduling information (SI) packet, and sending the SI packet to the base station.

4. The method according to claim 1, after the receiving power control information that is sent by the base station, and determining an uplink channel transmit power according to the power control information, the method further comprises:
sending uplink data to the base station by using the uplink channel transmit power, which specifically comprises:
determining a maximum power offset according to the uplink channel transmit power, wherein the maximum power offset is a maximum ratio of the current uplink channel transmit power of the UE to the control channel transmit power; and
performing enhanced dedicated channel transport format combination (E-TFC) selection according to the maximum power offset so as to determine a transport format of the uplink data, and transmitting the uplink data in the determined transport format.

5. A method for acquiring downlink quality information, comprising:
acquiring, by a base station, downlink quality information sent by user equipment (UE), wherein the downlink quality information comprises at least one type of downlink quality information of a primary cell and downlink quality information of a neighboring cell;
wherein the acquiring downlink quality information comprises:
receiving the downlink quality information reported by the UE; or
receiving downlink quality information sent by a radio network controller (RNC)
determining power control information according to the downlink quality information, and sending the power control information to the UE, so that the UE determines an uplink channel transmit power according to the power control information; and
setting instruction signaling at an upper layer, and sending the instruction signaling to the UE, wherein the instruction signaling is used to instruct the UE to determine, when the power control information is not acquired at a current transmission time interval (TTI), the uplink channel transmit power according to power control information that is previously acquired.

6. The method according to claim 5, wherein the acquiring, by a base station, downlink quality information sent by UE specifically comprises:
acquiring at least one of downlink transmission pathloss information of the primary cell and downlink Pathloss information of the neighboring cell; or
acquiring information about a pathloss difference between downlink pathloss information of the primary cell and downlink pathloss information of the neighboring cell.

7. The method according to claim 5, wherein the receiving the downlink quality information reported by the UE comprises:
receiving an enhanced uplink protocol data unit MAC-i PDU reported by the UE, wherein the MAC-i PDU carries the downlink quality information; and
acquiring the downlink quality information from the MAC-i PDU.

8. An apparatus for acquiring downlink quality information, comprising:
a processor, configured to measure the downlink quality information, measure a downlink quality of a primary cell and a downlink quality of a neighboring cell, and acquire at least one type of downlink quality information of the primary cell and downlink quality information of the neighboring cell; and
a transmitter, configured to report the downlink quality information measured by the processor to a network-side device, and send the downlink quality information to a base station or send the downlink quality information to a radio network controller (RNC), so that the RNC forwards the downlink quality information to a base station; and
a receiver, configured to receive power control information that is sent by the base station according to the downlink quality information; wherein the processor is configured to,
determine an uplink channel transmit power according to the power control information; and
determine, when the power control information is not acquired at a current transmission time interval (TTI), the uplink channel transmit power according to power control information that is previously acquired.

9. The apparatus according to claim 8, wherein
the processor is configured to measure at least one of downlink transmission pathloss information of the primary cell and downlink pathloss information of the neighboring cell; or
the processor is configured to measure information about a pathloss difference between the downlink of the primary cell and the downlink of the neighboring cell.

10. The apparatus according to claim 8, wherein the transmitter is configured to: when sending the downlink quality information to the base station, add the downlink quality information into an enhanced uplink protocol data unit (MAC-i PDU) and send the MAC-i PDU to the base station, or add the downlink quality information into a scheduling information (SI) packet and send the SI packet to the base station.

11. The apparatus according to claim 8, wherein the transmitter is further configured to send uplink data to the base station by using the uplink channel transmit power determined by the processor, wherein
the processor is configured to: determine a maximum power offset according to the uplink channel transmit power determined by the processor; perform enhanced dedicated channel transport format combination (E-TFC) selection according to the maximum power offset so as to determine a transport format of the uplink data; and the transmitter is configured to transmit the uplink data in the determined transport format, wherein the maximum power offset is a maximum ratio of the current uplink channel transmit power of the UE to the control channel transmit power.

12. An apparatus for acquiring downlink quality information, comprising:
a processor, configured to acquire downlink quality information sent by user equipment (UE), wherein the downlink quality information comprises at least one type of downlink quality information of a primary cell and downlink quality information of a neighboring cell;
a receiver configured to receive the downlink quality information reported by the UE; or to receive downlink quality information sent by a radio network controller (RNC); and
a transmitter, wherein
the processor is configured to determine power control information according to the downlink quality information acquired by the processor and set instruction signaling at an upper layer; and
the transmitter is configured to
send the power control information determined by the processor to the UE, so that the UE determines an uplink channel transmit power according to the power control information, and
send the instruction signaling determined by the processor to the UE, wherein the instruction signaling is used to instruct the UE to determine, when the power control information is not acquired at a current transmission time interval (TTI), the uplink channel transmit power according to power control information that is previously acquired.

13. The apparatus according to claim 12, wherein the processor is configured to: acquire downlink transmission pathloss information of the primary cell, and/or acquire downlink pathloss information of the neighboring cell; or
the processor is configured to acquire information about a pathloss difference between downlink pathloss information of the primary cell and downlink pathloss information of the neighboring cell.

14. The apparatus according to claim 11, wherein the receiver is configured to receive an enhanced uplink protocol data unit (MAC-i PDU) reported by the UE, wherein the MAC-i PDU carries the downlink quality information; and
the processor is configured to acquire the downlink quality information from the MAC-i PDU received by the first receiving module.

* * * * *